US009736822B2

(12) United States Patent
Oizumi

(10) Patent No.: US 9,736,822 B2
(45) Date of Patent: Aug. 15, 2017

(54) TERMINAL DEVICE AND TRANSMISSION METHOD

(71) Applicant: Panasonic Intellectual Property Corporation of America, Torrance, CA (US)

(72) Inventor: Toru Oizumi, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

(21) Appl. No.: 14/399,496

(22) PCT Filed: Mar. 15, 2013

(86) PCT No.: PCT/JP2013/001772
§ 371 (c)(1),
(2) Date: Nov. 6, 2014

(87) PCT Pub. No.: WO2013/175691
PCT Pub. Date: Nov. 28, 2013

(65) Prior Publication Data
US 2015/0098340 A1    Apr. 9, 2015

(30) Foreign Application Priority Data
May 23, 2012    (JP) .................................. 2012-117626

(51) Int. Cl.
*H04W 28/04*    (2009.01)
*H04W 72/04*    (2009.01)
(Continued)

(52) U.S. Cl.
CPC ....... *H04W 72/0413* (2013.01); *H04L 1/0061* (2013.01); *H04L 1/1692* (2013.01);
(Continued)

(58) Field of Classification Search
None
See application file for complete search history.

(56) References Cited

U.S. PATENT DOCUMENTS 8,879,497 B2 * 11/2014 Oizumi et al. ................ 370/329
2008/0311942 A1 * 12/2008 Kim et al. .................... 455/509
(Continued)

FOREIGN PATENT DOCUMENTS

| JP | 2012-104874 A | 5/2012 |
|---|---|---|
| WO | 2011/087022 A1 | 7/2011 |
| WO | 2012/035712 A1 | 3/2012 |

OTHER PUBLICATIONS

3GPP TR 36.808 V1.7.0, "3rd Generation Partnership Project; Technical Specification Group Radio Access Network; Evolved Universal Terrestrial Radio Access (E-UTRA); Carrier Aggregation; Base Station (BS) radio transmission and reception (Release 10)," Aug. 2011, 27 pages.
(Continued)

*Primary Examiner* — Omar Ghowrwal
*Assistant Examiner* — Angel Brockman
(74) *Attorney, Agent, or Firm* — Seed IP Law Group LLP

(57) ABSTRACT

A control unit (208) transmits a response signal on an uplink control channel on the basis of a rule. In the rule, error detection result pattern candidates are associated with multiple resources of the uplink control channel used in the transmission of the response signal and with phase points within each resource, and at least a specific pattern candidate, wherein the pattern for a specific error detection result with respect to downlink data of a first unit band is identical to the error detection result pattern when communication with the base station (100) occurs using only the first unit band, and the error detection results other than the specific error detection result are all NACK or DTX, is associated with the first resource of the multiple resources. In addition,
(Continued)

at least the first resource of the multiple resources is arranged within the first unit band.

10 Claims, 17 Drawing Sheets

(51) Int. Cl.
    *H04L 1/00*           (2006.01)
    *H04L 1/16*           (2006.01)
    *H04L 5/00*           (2006.01)
    *H04L 5/14*           (2006.01)
    *H04W 52/02*        (2009.01)

(52) U.S. Cl.
    CPC ............ *H04L 5/001* (2013.01); *H04L 5/0055* (2013.01); *H04L 5/14* (2013.01); *H04W 28/04* (2013.01); *H04W 52/0212* (2013.01); *Y02B 60/50* (2013.01)

(56) References Cited

U.S. PATENT DOCUMENTS

| | | | |
|---|---|---|---|
| 2009/0316630 A1* | 12/2009 | Yamada et al. | 370/328 |
| 2010/0246512 A1* | 9/2010 | Kawamura | H04L 1/0026 |
| | | | 370/329 |
| 2010/0296459 A1* | 11/2010 | Miki | H04L 1/0028 |
| | | | 370/329 |
| 2011/0243066 A1* | 10/2011 | Nayeb Nazar et al. | 370/328 |
| 2012/0099555 A1* | 4/2012 | Yoshii et al. | 370/329 |
| 2012/0155302 A1* | 6/2012 | Jeong | 370/252 |
| 2012/0281602 A1 | 11/2012 | Tsunekawa | |
| 2012/0314674 A1* | 12/2012 | Seo et al. | 370/329 |
| 2013/0163406 A1 | 6/2013 | Oizumi et al. | |

OTHER PUBLICATIONS

3GPP TS 36.211 V10.4.0, "3rd Generation Partnership Project; Technical Specification Group Radio Access Network; Evolved Universal Terrestrial Radio Access (E-UTRA); Physical Channels and Modulation (Release 10)," Dec. 2011, 101 pages.

3GPP TS 36.212 V10.5.0, "3rd Generation Partnership Project; Technical Specification Group Radio Access Network; Evolved Universal Terrestrial Radio Access (E-UTRA); Multiplexing and channel coding (Release 10)," Mar. 2012, 79 pages.

3GPP TS 36.213 V10.5.0, "3rd Generation Partnership Project; Technical Specification Group Radio Access Network; Evolved Universal Terrestrial Radio Access (E-UTRA); Physical layer procedures (Release 10)," Mar. 2012, 125 pages.

International Search Report dated Apr. 16, 2013, for corresponding International Application No. PCT/JP2013/001772, 4 pages.

Nakao et al., "Performance enhancement of E-UTRA uplink control channel in fast fading environments," IEEE 69th Vehicular Technology Conference, VTC Spring 2009, 5 pages.

ZTE, "Uplink Control Channel Design for LTE-Advanced," R1-091702, TSG-RAN WG1 #57, Agenda Item: 15.4, San Francisco, USA, May 4-8, 2009, 6 pages.

Panasonic, "UL ACK/NACK transmission on PUCCH for carrier aggregation," R1-091744, 3GPP TSG-RAN WG1 Meeting #57, Agenda Item: 15.4, San Francisco, USA, May 4-8, 2009, 3 pages.

Ericsson, ST-Ericsson, "A/N transmission in the uplink for carrier aggregation," R1-100909, 3GPP TSG-RAN WG1 #60, Agenda Item: T1.6, San Francisco, USA, Feb. 22-26, 2010, 4 pages.

Fujitsu, "Channel Selection for A/N feedback in CA," R1-104875, 3GPP TSG-RAN1 #62, Agenda Item: 6.2.2.1, Madrid, Spain, Aug. 23-27, 2010, 5 pages.

Panasonic, "Mapping Tables for Format 1b with Channel Selection," R1-105476, 3GPP TSG RAN WG1 Meeting #62bis 105476, Agenda Item: 6.2.1.1 Remaining details for A/N transmission, Xi'an, China, Oct. 11-15, 2010, 7 pages.

\* cited by examiner

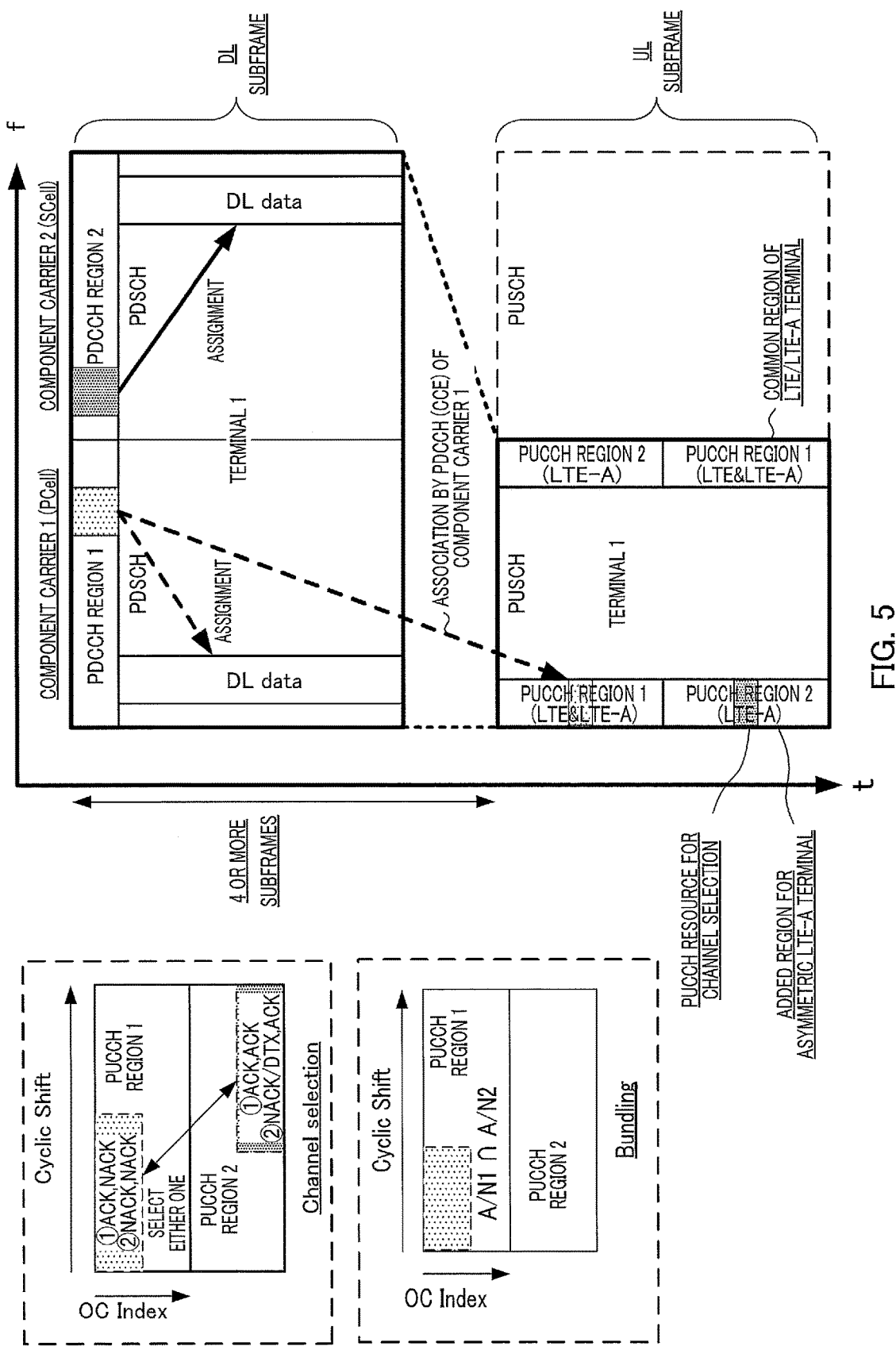

FIG. 6A

| PCell b0 | SCell b1 | PUCCH resource | Constellation |
|---|---|---|---|
| A | A | h1 | -1 |
| A | N/D | h0 | -1 |
| N/D | A | h1 | +1 |
| N/D | N/D | h0 | +1 |

TWO DOWNLINK COMPONENT CARRIERS AND ONE CW PER DOWNLINK COMPONENT CARRIER

FIG. 6B

| MIMO Cell b0 | MIMO Cell b1 | non-MIMO cell b2 | PUCCH resource | Constellation |
|---|---|---|---|---|
| A | A | A | h1 | -1 |
| A | N | A | h1 | +j |
| N | A | A | h1 | -j |
| N/D | N/D | A | h2 | -1 |
| A | A | N/D | h0 | +j |
| N | A | N/D | h0 | -j |
| N/D | N/D | N | h2 | +1 |
| N | N | D | h0 | +1 |

TWO DOWNLINK COMPONENT CARRIERS, ONE CW FOR ONE DOWNLINK COMPONENT CARRIER AND TWO CWS FOR OTHER DOWNLINK COMPONENT CARRIER

FIG. 6C

| PCell b0 | PCell b1 | SCell b2 | SCell b3 | PUCCH resource | Constellation |
|---|---|---|---|---|---|
| A | A | A | A | h1 | -1 |
| A | A | A | A | h2 | -j |
| N | A | A | A | h1 | -j |
| N/D | A | A | A | h3 | -1 |
| A | N | A | A | h1 | +j |
| N | N/D | A | A | h2 | +1 |
| N/D | A | A | N | h1 | +j |
| A | A | A | N | h3 | -1 |
| N | A | N | A | h2 | -j |
| N/D | A | N | A | h3 | +1 |
| A | A | N/D | N/D | h0 | +j |
| N | A | N/D | N/D | h0 | -j |
| N/D | N | N/D | N/D | h0 | -1 |
| A | N | N/D | N/D | h0 | +1 |

TWO DOWNLINK COMPONENT CARRIERS, AND TWO CWS PER DOWNLINK COMPONENT CARRIER

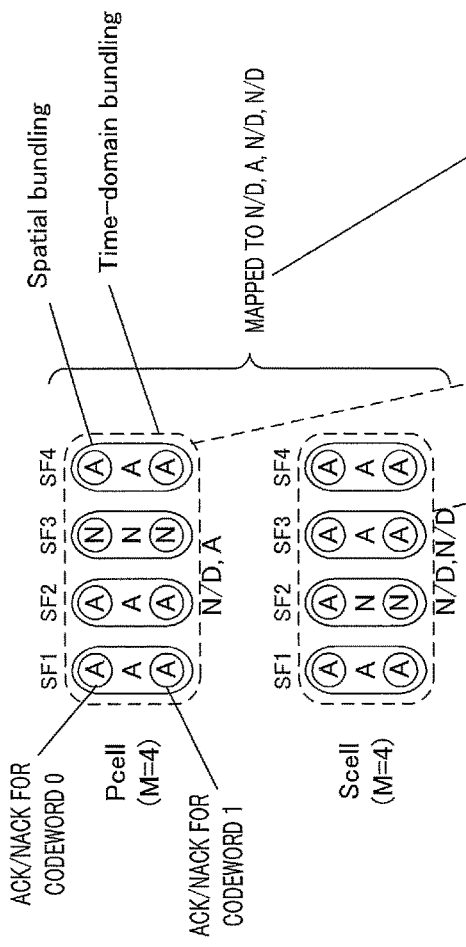
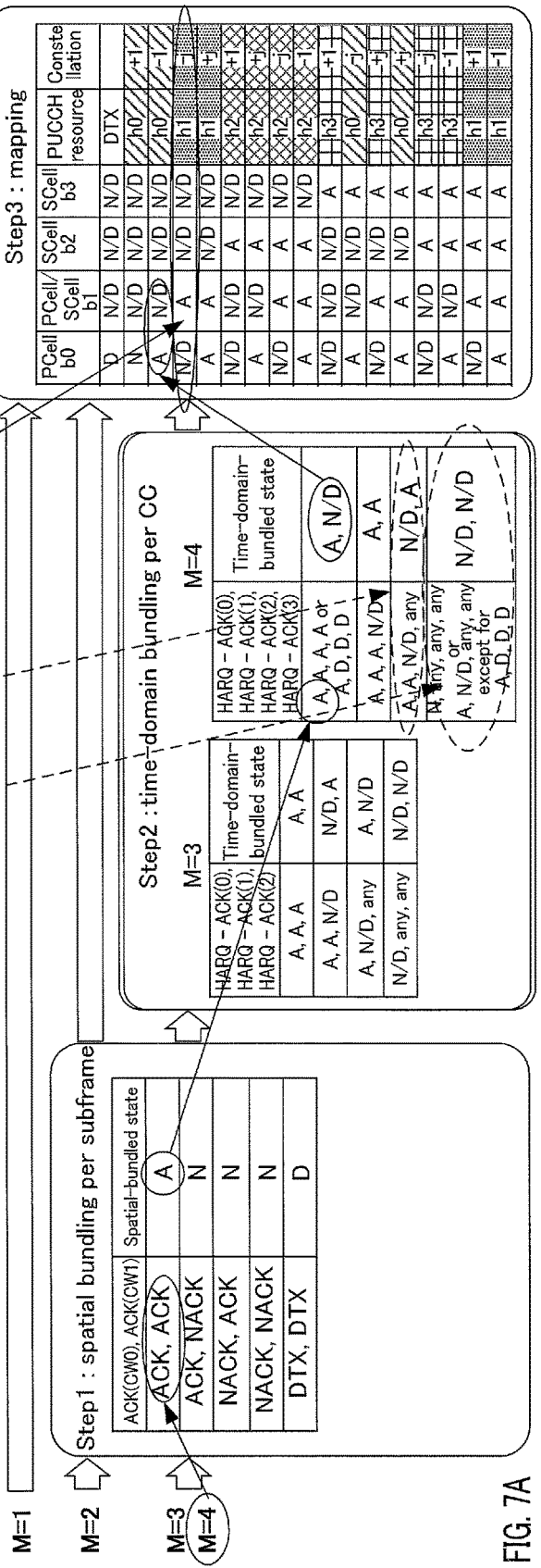
FIG. 7B
FIG. 7A

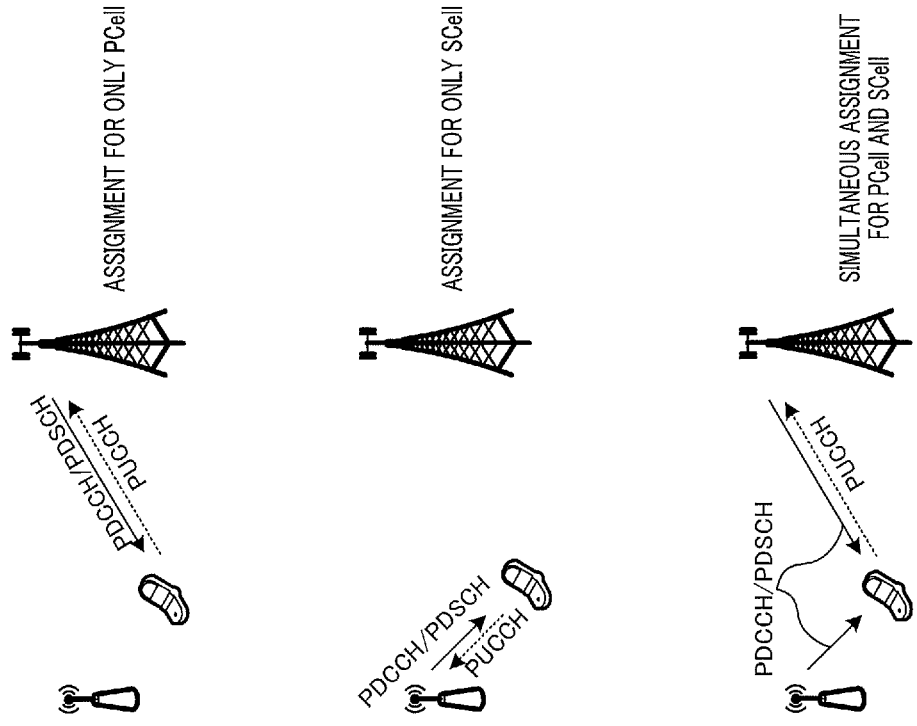
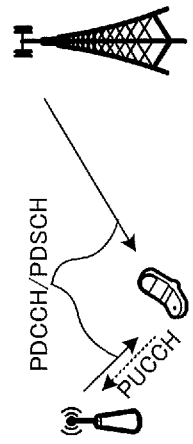
FIG. 9

FIG. 13

RESOURCE FOR PCell ASSOCIATED WITH TOP CCE INDEX ($n_{CCE}$) OF PDCCH INDICATING PCell PDSCH

| PCell | | SCell | | PUCCH resource | Possibility[%] | SUM[%] |
|---|---|---|---|---|---|---|
| b0 | b1 | b2 | b3 | | | |
| A | A | N/D | N/D | h0 | 1.60 | 1.97 |
| A | N | N/D | N/D | | 0.18 | |
| N | A | N/D | N/D | | 0.18 | |
| N | N | N/D | N/D | | 0.02 | |
| A | A | A | A | h1 / h2 | 64.30 | 79.39 |
| N | A | A | A | | 7.14 | |
| A | N | A | A | | 7.14 | |
| A | A | N | A | | 0.79 | |
| A | A | A | N | | 7.14 | |
| N | N | A | A | | 0.79 | |
| A | N | A | N | | 7.14 | |
| A | A | N | N | | 0.79 | |
| N | A | N | A | | 7.14 | |
| A | N | N | A | | 0.79 | |
| A | A | A | A | h3 | 1.60 | 2.74 |
| N/D | N/D | A | A | | 0.18 | |
| N/D | N/D | N | A | | 0.79 | |
| N | A | N | A | | 0.18 | |
| N/D | N/D | A | N | | 0.02 | |
| N/D | N/D | D | D | No Tx | 0.02 | 0.02 |

RESOURCE FOR SCell

| PCell | | SCell | | PUCCH resource | Possibility[%] | SUM[%] | |
|---|---|---|---|---|---|---|---|
| b0 | b1 | b2 | b3 | | | | |
| N | N/D | N/D | N/D | h0 | 0.01 | 0.13 | 8.78 |
| A | N/D | N/D | N/D | h0 | 0.12 | | |
| A | N/D | N/D | A | h0 | 0.94 | 8.65 | |
| A | A | N/D | A | h0 | 7.71 | | |
| N/D | A | N/D | N/D | h1 | 0.12 | 1.06 | 71.79 |
| A | A | N/D | N/D | h1 | 0.94 | | |
| N/D | A | A | N/D | h1 | 7.71 | 70.73 | |
| A | A | A | N/D | h1 | 63.02 | | |
| N/D | N/D | A | N/D | h2 | 0.12 | 9.71 | |
| A | N/D | A | N/D | h2 | 0.94 | | |
| N/D | A | A | A | h2 | 0.94 | | |
| A | A | A | A | h2 | 7.71 | | |
| N/D | N/D | N/D | N/D | h3 | 0.12 | 9.71 | |
| N/D | A | N/D | N/D | h3 | 0.94 | | |
| N/D | N/D | A | N/D | h3 | 0.94 | | |
| A | N/D | A | A | h3 | 7.71 | | |
| D | N/D | N/D | N/D | No Tx | 0.00 | 0.00 | |

RESOURCE FOR PCell ASSOCIATED WITH TOP CCE INDEX ($n_{CCE}$) OF PDCCH INDICATING PCell PDSCH RESOURCE FOR SCell

| PCell | | SCell | | PUCCH resource | Possibility[%] | SUM[%] | |
|---|---|---|---|---|---|---|---|
| b0 | b1 | b2 | b3 | | | | |
| N | N/D | N/D | N/D | h0 | 0.01 | 0.13 | 8.78 |
| A | N/D | N/D | N/D | h4 | 0.12 | | |
| A | N/D | N/D | A | h4 | 0.94 | 8.65 | |
| A | A | N/D | A | h4 | 7.71 | | |
| N/D | A | N/D | N/D | h1 | 0.12 | 1.06 | 71.79 |
| A | A | N/D | A | h1 | 0.94 | | |
| N/D | A | A | N/D | h1 | 7.71 | 70.73 | |
| A | A | A | A | h1 | 63.02 | | |
| A | N/D | A | N/D | h2 | 0.12 | 9.71 | |
| N/D | N/D | A | N/D | h2 | 0.94 | | |
| N/D | N/D | A | A | h2 | 0.94 | | |
| A | N/D | A | A | h2 | 7.71 | | |
| N/D | A | N/D | N/D | h3 | 0.12 | 9.71 | |
| N/D | A | A | A | h3 | 0.94 | | |
| N/D | N/D | A | A | h3 | 0.94 | | |
| A | N/D | N/D | N/D | h3 | 7.71 | | |
| D | N/D | N/D | N/D | No Tx | 0.00 | 0.00 | |

| PCell | | SCell | | PUCCH resource | Possibility[%] | SUM[%] | |
|---|---|---|---|---|---|---|---|
| b0 | b1 | b2 | b3 | | | | |
| N | N/D | N/D | N/D | h0 | 0.01 | 0.13 | 8.78 |
| A | N/D | N/D | N/D | | 0.12 | | |
| A | N/D | N/D | A | h4 | 0.94 | 8.65 | |
| A | N/D | N/D | A | | 7.71 | | |
| N/D | A | N/D | N/D | h1 | 0.12 | 1.06 | 71.79 |
| A | A | N/D | N/D | | 0.94 | | |
| N/D | A | N/D | A | | 7.71 | | |
| A | A | A | A | h5 | 63.02 | 70.73 | |
| N/D | N/D | A | N/D | h2 | 0.12 | | 9.71 |
| A | N/D | A | N/D | | 0.94 | 9.71 | |
| N/D | N/D | A | A | | 0.94 | | |
| A | N/D | A | A | | 7.71 | | |
| N/D | A | A | N/D | h3 | 0.12 | | 9.71 |
| N/D | A | A | N/D | | 0.94 | 9.71 | |
| N/D | A | A | A | | 0.94 | | |
| A | A | N/D | A | | 7.71 | | |
| D | N/D | N/D | N/D | No Tx | 0.00 | 0.00 | |

RESOURCE FOR PCell

RESOURCE FOR PCell ASSOCIATED WITH TOP CCE INDEX ($n_{CCE}$) OF PDCCH INDICATING PCell PDSCH RESOURCE FOR SCell

| PCell | | SCell | | PUCCH resource | Possibility[%] | SUM[%] |
|---|---|---|---|---|---|---|
| b0 | b1 | b2 | b3 | | | |
| N | N/D | N/D | N/D | | 0.01 | 8.78 |
| A | N/D | N/D | N/D | h0 (RESOURCE FOR PCell ASSOCIATED WITH TOP CCE INDEX ($n_{CCE}$) OF PDCCH INDICATING PCell PDSCH) | 0.12 | |
| A | N/D | N/D | N/D | | 0.94 | |
| A | A | N/D | N/D | | 7.71 | |
| N/D | A | N/D | N/D | h1 | 0.13 | 71.79 |
| A | A | N/D | N/D | | 0.12 | |
| A | A | N/D | N/D | | 0.94 | |
| A | A | A | N/D | | 8.65 | |
| N/D | N/D | A | N/D | h2 | 1.06 | |
| A | N/D | A | N/D | | 0.12 | |
| A | N/D | A | N/D | | 0.94 | |
| A | A | A | N/D | | 0.94 | |
| N/D | N/D | N/D | A | | 70.73 | |
| N/D | A | N/D | A | h3 (RESOURCE FOR SCell) | 7.71 | 9.71 |
| N/D | N/D | A | A | | 0.12 | |
| N/D | A | A | A | | 0.94 | |
| A | N/D | N/D | A | | 0.94 | |
| N/D | N/D | N/D | A | | 7.71 | 9.71 |
| A | A | N/D | A | | 0.12 | |
| N/D | A | N/D | A | | 0.94 | |
| N/D | N/D | A | A | | 0.94 | |
| A | N/D | A | A | | 7.71 | |
| D | N/D | N/D | N/D | No Tx | 0.00 | 0.00 |

TERMINAL DEVICE AND TRANSMISSION METHOD

TECHNICAL FIELD

The present invention relates to a terminal apparatus and a transmission method.

BACKGROUND ART

3GPP LTE employs Orthogonal Frequency Division Multiple Access (OFDMA) as a downlink communication scheme. In radio communication systems to which 3GPP LTE is applied, base stations transmit synchronization signals (i.e., Synchronization Channel: SCH) and broadcast signals (i.e., Broadcast Channel: BCH) using predetermined communication resources. Meanwhile, each terminal finds an SCH first and thereby ensures synchronization with the base station. Subsequently, the terminal reads BCH information to acquire base station-specific parameters (e.g., frequency bandwidth) (see, Non-Patent Literature (hereinafter, abbreviated as NPL) 1, 2 and 3).

In addition, upon completion of the acquisition of the base station-specific parameters, each terminal sends a connection request to the base station to thereby establish a communication link with the base station. The base station transmits control information via Physical Downlink Control CHannel (PDCCH) as appropriate to the terminal with which a communication link has been established via a downlink control channel or the like.

The terminal performs "blind-determination" on each of a plurality of pieces of control information included in the received PDCCH signal (i.e., Downlink (DL) Assignment Control Information: also referred to as Downlink Control Information (DCI)). More specifically, each piece of the control information includes a Cyclic Redundancy Check (CRC) part and the base station masks this CRC part using the terminal ID of the transmission target terminal. Accordingly, until the terminal demasks the CRC part of the received piece of control information with its own terminal ID, the terminal cannot determine whether or not the piece of control information is intended for the terminal. In this blind-determination, if the result of demasking the CRC part reports that the CRC operation is OK, the piece of control information is determined as being intended for the terminal.

Moreover, in 3GPP LTE, Automatic Repeat Request (ARQ) is applied to downlink data to terminals from a base station. More specifically, each terminal feeds back a response signal indicating the result of error detection on the downlink data to the base station. Each terminal performs a CRC on the downlink data and feeds back Acknowledgment (ACK) when CRC=OK (no error) or Negative Acknowledgment (NACK) when CRC=Not OK (error) to the base station as a response signal. An uplink control channel such as Physical Uplink Control Channel (PUCCH) is used to feed back the response signals (i.e., ACK/NACK signals (hereinafter, may be referred to as "A/N," simply)).

The control information to be transmitted from a base station herein includes resource assignment information including information on resources assigned to the terminal by the base station. As described above, PDCCH is used to transmit this control information. This PDCCH includes one or more L1/L2 control channels (L1/L2 CCH). Each L1/L2 CCH consists of one or more Control Channel Elements (CCE). To put it more specifically, a CCE is the basic unit used to map the control information to PDCCH. Moreover, when a single L1/L2 CCH consists of a plurality of CCEs (2, 4 or 8), a plurality of contiguous CCEs starting from a CCE having an even index are assigned to the L1/L2 CCH. The base station assigns the L1/L2 CCH to the resource assignment target terminal in accordance with the number of CCEs required for indicating the control information to the resource assignment target terminal. The base station maps the control information to physical resources corresponding to the CCEs of the L1/L2 CCH and transmits the mapped control information.

In addition, CCEs are associated with component resources of PUCCH (hereinafter, may be referred to as "PUCCH resource") in a one-to-one correspondence. Accordingly, a terminal that has received an L1/L2 CCH identifies the component resources of PUCCH that correspond to the CCEs forming the L1/L2 CCH and transmits a response signal to the base station using the identified resources. However, when the L1/L2 CCH occupies a plurality of contiguous CCEs, the terminal transmits the response signal to the base station using a PUCCH component resource corresponding to a CCE having a smallest index among the plurality of PUCCH component resources respectively corresponding to the plurality of CCEs (i.e., PUCCH component resource associated with a CCE having an even numbered CCE index). In this manner, the downlink communication resources are efficiently used.

As illustrated in FIG. 1, a plurality of response signals transmitted from a plurality of terminals are spread using a Zero Auto-correlation (ZAC) sequence having the characteristic of zero autocorrelation in time-domain, a Walsh sequence and a discrete Fourier transform (DFT) sequence, and are code-multiplexed in a PUCCH. In FIG. 1, ($W_0$, $W_1$, $W_2$, $W_3$) represent a length-4 Walsh sequence and ($F_0$, $F_1$, $F_2$) represent a length-3 DFT sequence. As illustrated in FIG. 1, ACK or NACK response signals are primary-spread over frequency components corresponding to 1 SC-FDMA symbol by a ZAC sequence (length-12) in frequency-domain. More specifically, the length-12 ZAC sequence is multiplied by a response signal component represented by a complex number. Subsequently, the ZAC sequence serving as the response signals and reference signals after the primary-spread is secondary-spread in association with each of a Walsh sequence (length-4: $W_0$-$W_3$ (may be referred to as Walsh Code Sequence)) and a DFT sequence (length-3: $F_0$-$F_2$). More specifically, each component of the signals of length-12 (i.e., response signals after primary-spread or ZAC sequence serving as reference signals (i.e., Reference Signal Sequence) is multiplied by each component of an orthogonal code sequence (i.e., orthogonal sequence: Walsh sequence or DFT sequence). Moreover, the secondary-spread signals are transformed into signals of length-12 in the time-domain by inverse fast Fourier transform (IFFT). A CP is added to each signal obtained by IFFT processing, and the signals of one slot consisting of seven SC-FDMA symbols are thus formed.

The response signals from different terminals are spread using ZAC sequences each corresponding to a different cyclic shift value (i.e., index) or orthogonal code sequences each corresponding to a different sequence number (i.e., orthogonal cover index (OC index)). An orthogonal code sequence is a combination of a Walsh sequence and a DFT sequence. In addition, an orthogonal code sequence is referred to as a block-wise spreading code in some cases. Thus, base stations can demultiplex the code-multiplexed plurality of response signals using the related art despreading and correlation processing (see, NPL 4).

However, it is not necessarily true that each terminal succeeds in receiving downlink assignment control signals because the terminal performs blind-determination in each subframe to find downlink assignment control signals intended for the terminal. When the terminal fails to receive the downlink assignment control signals intended for the terminal on a certain downlink component carrier, the terminal would not even know whether or not there is downlink data intended for the terminal on the downlink component carrier. Accordingly, when a terminal fails to receive the downlink assignment control signals intended for the terminal on a certain downlink component carrier, the terminal generates no response signals for the downlink data on the downlink component carrier. This error case is defined as discontinuous transmission of ACK/NACK signals (DTX of response signals) in the sense that the terminal transmits no response signals. In 3GPP, operation is performed such that the probability of correctly detecting a downlink assignment control signal intended for the terminal becomes 99% (DTX probability is 1%).

In 3GPP LTE systems (may be referred to as "LTE system," hereinafter), base stations assign resources to uplink data and downlink data, independently. For this reason, in the 3GPP LTE system, terminals (i.e., terminals compliant with LTE system (hereinafter, referred to as "LTE terminal")) encounter a situation where the terminals need to transmit uplink data and response signals for downlink data simultaneously in the uplink. In this situation, the response signals and uplink data from the terminals are transmitted using time-division multiplexing (TDM). As described above, the single carrier properties of transmission waveforms of the terminals are maintained by the simultaneous transmission of response signals and uplink data using TDM.

In addition, as illustrated in FIG. 2, the response signals (i.e., "A/N") transmitted from each terminal partially occupy the resources assigned to uplink data (i.e., Physical Uplink Shared CHannel (PUSCH) resources) (i.e., response signals occupy some SC-FDMA symbols adjacent to SC-FDMA symbols to which reference signals (RS) are mapped) and are thereby transmitted to a base station in time-division multiplexing (TDM). However, "subcarriers" in the vertical axis in FIG. 2 are also termed as "virtual subcarriers" or "time contiguous signals," and "time contiguous signals" that are collectively inputted to a discrete Fourier transform (DFT) circuit in a SC-FDMA transmitter are represented as "subcarriers" for convenience. To put it more specifically, optional data of the uplink data is punctured due to the response signals in the PUSCH resource. Accordingly, the quality of uplink data (e.g., coding gain) is significantly reduced due to the punctured bits of the coded uplink data. For this reason, base stations instruct the terminals to use a very low coding rate and/or to use very large transmission power so as to compensate for the reduced quality of the uplink data due to the puncturing.

Meanwhile, the standardization of 3GPP LTE-Advanced for realizing faster communication than 3GPP LTE is in progress. 3GPP LTE-Advanced systems (may be referred to as "LTE-A system," hereinafter) follow LTE systems. 3GPP LTE-Advanced will introduce base stations and terminals capable of communicating with each other using a wideband frequency of 40 MHz or greater to realize a downlink transmission rate of up to 1 Gbps or above.

In the LTE-A system, in order to simultaneously achieve backward compatibility with the LTE system and ultra-high-speed communication several times faster than transmission rates in the LTE system, the LTE-A system band is divided into "component carriers" of 20 MHz or below, which is the bandwidth supported by the LTE system. In other words, the "component carrier" is defined herein as a band having a maximum width of 20 MHz and as the basic unit of communication band. In the Frequency Division Duplex (FDD) system, moreover, "component carrier" in downlink (hereinafter, referred to as "downlink component carrier") is defined as a band obtained by dividing a band according to downlink frequency bandwidth information in a BCH broadcasted from a base station or as a band defined by a distribution width when a downlink control channel (PDCCH) is distributed in the frequency domain. In addition, "component carrier" in uplink (hereinafter, referred to as "uplink component carrier") may be defined as a band obtained by dividing a band according to uplink frequency band information in a BCH broadcasted from a base station or as the basic unit of a communication band of 20 MHz or below including a Physical Uplink Shared CHannel (PUSCH) in the vicinity of the center of the bandwidth and PUCCHs for LTE on both ends of the band. In addition, the term "component carrier" may be also referred to as "cell" in English in 3GPP LTE-Advanced. Furthermore, "component carrier" may also be abbreviated as CC(s).

In the Time Division Duplex (TDD) system, a downlink component carrier and an uplink component carrier have the same frequency band, and downlink communication and uplink communication are realized by switching between the downlink and uplink on a time division basis. For this reason, in the case of the TDD system, the downlink component carrier can also be expressed as "downlink communication timing in a component carrier." The uplink component carrier can also be expressed as "uplink communication timing in a component carrier." The downlink component carrier and the uplink component carrier are switched based on a UL-DL configuration as shown in FIG. 3. In the UL-DL configuration shown in FIG. 3, timings are configured in subframe units (that is, 1 msec units) for downlink communication (DL) and uplink communication (UL) per frame (10 msec). The UL-DL configuration can construct a communication system capable of flexibly meeting a downlink communication throughput requirement and an uplink communication throughput requirement by changing a subframe ratio between downlink communication and uplink communication. For example, FIG. 3 illustrates UL-DL configurations (Config 0 to 6) having different subframe ratios between downlink communication and uplink communication. In addition, in FIG. 3, a downlink communication subframe is represented by "D," an uplink communication subframe is represented by "U" and a special subframe is represented by "S." Here, the special subframe is a subframe at the time of switchover from a downlink communication subframe to an uplink communication subframe. In the special subframe, downlink data communication may be performed as in the case of the downlink communication subframe. In each UL-DL configuration shown in FIG. 3, subframes (20 subframes) corresponding to 2 frames are expressed in two stages: subframes ("D" and "S" in the upper row) used for downlink communication and subframes ("U" in the lower row) used for uplink communication. Furthermore, as shown in FIG. 3, an error detection result corresponding to downlink data (ACK/NACK) is reported in the fourth uplink communication subframe or an uplink communication subframe after the fourth subframe after the subframe to which the downlink data is assigned.

The LTE-A system supports communication using a band obtained by bundling some component carriers, so-called carrier aggregation (CA). Note that while a UL-DL configuration can be set for each component carrier, an LTE-A system compliant terminal (hereinafter, referred to as "LTE-A terminal") is designed assuming that the same UL-DL configuration is set among a plurality of component carriers.

FIGS. 4A and 4B are diagrams provided for describing asymmetric carrier aggregation and a control sequence thereof applicable to individual terminals.

As illustrated in FIG. 4B, a configuration in which carrier aggregation is performed using two downlink component carriers and one uplink component carrier on the left is set for terminal 1, while a configuration in which the two downlink component carriers identical with those used by terminal 1 are used but uplink component carrier on the right is used for uplink communication is set for terminal 2.

Referring to terminal 1, a base station included an LTE-A system (that is, LTE-A system compliant base station (hereinafter, referred to as "LTE-A base station") and an LTE-A terminal included in the LTE-A system transmit and receive signals to and from each other in accordance with the sequence diagram illustrated in FIG. 4A. As illustrated in FIG. 4A, (1) terminal 1 is synchronized with the downlink component carrier on the left when starting communications with the base station and reads information on the uplink component carrier paired with the downlink component carrier on the left from a broadcast signal called system information block type 2 (SIB2). (2) Using this uplink component carrier, terminal 1 starts communication with the base station by transmitting, for example, a connection request to the base station. (3) Upon determining that a plurality of downlink component carriers need to be assigned to the terminal, the base station instructs the terminal to add a downlink component carrier. However, in this case, the number of uplink component carriers does not increase, and terminal 1, which is an individual terminal, starts asymmetric carrier aggregation.

In addition, in the LTE-A system to which carrier aggregation is applied, a terminal may receive a plurality of pieces of downlink data on a plurality of downlink component carriers at a time. In LTE-A, channel selection (also referred to as "multiplexing"), bundling and a discrete Fourier transform spread orthogonal frequency division multiplexing (DFT-S-OFDM) format are available as a method of transmitting a plurality of response signals for the plurality of pieces of downlink data. In channel selection, a terminal causes not only symbol points used for response signals, but also the resources to which the response signals are mapped to vary in accordance with the pattern for results of the error detection on the plurality of pieces of downlink data. Compared with channel selection, in bundling, the terminal bundles ACK or NACK signals generated according to the results of error detection on the plurality of pieces of downlink data (i.e., by calculating a logical AND of the results of error detection on the plurality of pieces of downlink data, provided that ACK=1 and NACK=0), and response signals are transmitted using one predetermine resource. In transmission using the DFT-S-OFDM format, a terminal jointly encodes (i.e., joint coding) the response signals for the plurality of pieces of downlink data and transmits the coded data using the format (see, NPL 5). For example, a terminal may send the response signals (i.e., ACK/NACK) as feedback using channel selection, bundling or DFT-S-OFDM according to the number of bits for a pattern for results of error detection. Alternatively, a base station may previously configure the method of transmitting the response signals.

Channel Selection is a technique that varies not only the phase points (i.e., constellation points) for the response signals but also the resources used for transmission of the response signals (may be referred to as "PUCCH resource," hereinafter) on the basis of whether the results of error detection on the plurality of pieces of downlink data for each downlink component carrier received on the plurality of downlink component carriers (a maximum of two downlink component carriers) are each an ACK or NACK as illustrated in FIG. 5. Meanwhile, bundling is a technique that bundles ACK/NACK signals for the plurality of pieces of downlink data into a single set of signals and thereby transmits the bundled signals using one predetermined resource (see, NPLs 6 and 7). Hereinafter, the set of the signals formed by bundling ACK/NACK signals for a plurality of pieces of downlink data into a single set of signals may be referred to as "bundled ACK/NACK signals."

The following two methods are considered as a possible method of transmitting response signals in uplink when a terminal receives downlink assignment control information via a PDCCH and receives downlink data.

One of the methods is to transmit response signals using a PUCCH resource associated in a one-to-one correspondence with a control channel element (CCE) occupied by the PDCCH (i.e., implicit signaling) (hereinafter, method 1). More specifically, when DCI intended for a terminal served by a base station is mapped in a PDCCH region, each PDCCH occupies a resource consisting of one or a plurality of contiguous CCEs. In addition, as the number of CCEs occupied by a PDCCH (i.e., the number of aggregated CCEs: CCE aggregation level), one of aggregation levels 1, 2, 4 and 8 is selected according to the number of information bits of the assignment control information or a propagation path condition of the terminal, for example.

The other method is to previously indicate a PUCCH resource to each terminal from a base station (i.e., explicit signaling) (hereinafter, method 2). To put it differently, each terminal transmits response signals using the PUCCH resource previously indicated by the base station in method 2.

Furthermore, as shown in FIG. 5, the terminal transmits response signals using one of two component carriers. A component carrier that transmits such response signals is called "primary component carrier (PCC) or primary cell (PCell)." The other component carrier is called "secondary component carrier (SCC) or secondary cell (SCell)." For example, the PCC (PCell) is a component carrier that transmits broadcast information on a component carrier that transmits response signals (e.g., system information block type 1 (SIB1)).

In method 2, PUCCH resource common to a plurality of terminals (e.g., four PUCCH resources) may be previously indicated to the terminals from a base station. For example, terminals may employ a method to select one PUCCH resource to be actually used, on the basis of a transmit power control (TPC) command of two bits included in DCI in SCell. In this case, the TPC command is also called an ACK/NACK resource indicator (ARI). Such a TPC command allows a certain terminal to use an explicitly signaled PUCCH resource in a certain subframe while allowing another terminal to use the same explicitly signaled PUCCH resource in another subframe in the case of explicit signaling. Meanwhile, in channel selection, a PUCCH resource in an uplink component carrier associated in a one-to-one correspondence with the top CCE index of the CCEs occupied by the PDCCH indicating the PDSCH in PCC (PCell) (i.e., PUCCH resource in PUCCH region 1 in FIG. 5) is assigned (implicit signaling).

Here, ARQ control using channel selection when the above asymmetric carrier aggregation is applied to a terminal will be described with reference to FIG. 5 and FIGS. 6A and 6B.

For example, in FIG. 5, a component carrier group (may be referred to as "component carrier set" in English) consisting of component carrier 1 (PCell) and component carrier 2 (SCell) is set for terminal 1. In this case, after downlink resource assignment information is transmitted to terminal 1 from the base station via a PDCCH of each of component carriers 1 and 2, downlink data is transmitted using the resource corresponding to the downlink resource assignment information.

Furthermore, in channel selection, response signals representing error detection results corresponding to a plurality of pieces of downlink data in component carrier 1 (PCell) and error detection results corresponding to a plurality of pieces of downlink data in component carrier 2 (SCell) are mapped to PUCCH resource included in PUCCH region 1 or PUCCH region 2. The terminal uses two types of phase points (Binary Phase Shift Keying (BPSK) mapping) or four types of phase points (Quadrature Phase Shift Keying (QPSK) mapping) as response signals thereof. That is, in channel selection, it is possible to express a pattern for results of error detection corresponding to a plurality of pieces of downlink data in component carrier 1 (PCell) and the results of error detection corresponding to a plurality of pieces of downlink data in component carrier 2 (SCell) by a combination of PUCCH resource and phase points.

Here, FIGS. 6A to 6C show a method of mapping a pattern for results of error detection when the number of component carriers is two (one PCell, one SCell) in an FDD system.

Note that FIGS. 6A to 6C assumes a case where the transmission mode is set to one of (a), (b) and (c) below.

(a) A transmission mode in which each component carrier supports only downlink one-CW (codeword) transmission (b) A transmission mode in which one component carrier supports only downlink one-CW transmission and the other component carrier supports up to downlink two-CW transmission (c) A transmission mode in which each component carrier supports up to downlink two-CW transmission In FIG. 6A, PUCCH resource 0 (h0 in FIG. 6A) is a resource associated in a one-to-one correspondence with the top CCE index ($n_{CCE}$) occupied by the PDCCH indicating the PCell PDSCH and PUCCH resource 1 (h1) is a resource selected by ARI indicated by the PDCCH indicating the SCell PDSCH.

In FIG. 6B, when PCell is in a transmission mode (non-MIMO Cell) that supports only downlink one-CW transmission and SCell is in a transmission mode (MIMO Cell) that supports up to downlink two-CW transmission, b2 is an error detection result corresponding to downlink data of PCell and b0 and b1 are error detection results corresponding to downlink data of SCell. At this time, PUCCH resource 2 (h2) is a resource associated in a one-to-one correspondence with the top CCE index ($n_{CCE}$) occupied by the PDCCH indicating the PCell PDSCH, and PUCCH resource 0 and PUCCH resource 1 (h0 and h1) are resources selected by ARI indicated by the PDCCH indicating the SCell PDSCH.

In FIG. 6B, when PCell is in a transmission mode that supports up to downlink two-CW transmission and SCell is in a transmission mode that supports only downlink one-CW transmission, b0 and b1 are error detection results corresponding to downlink data of PCell and b2 is an error detection result corresponding to downlink data of SCell. At this time, PUCCH resource 0 and PUCCH resource 1 (h0 and h1) are resources associated in a one-to-one correspondence with the top CCE index and the next index ($n_{CCE}$ and $n_{CCE}+1$) occupied by the PDCCH indicating the PCell PDSCH, and PUCCH resource 2 (h2) is a resource selected by ARI indicated by the PDCCH indicating the SCell PDSCH.

In FIG. 6C, PUCCH resource 0 and PUCCH resource 1 (h0 and h1) are resources associated in a one-to-one correspondence with the top CCE index and the next index ($n_{CCE}$ and $n_{CCE}+1$) occupied by the PDCCH indicating the PCell PDSCH, and PUCCH resource 2 and PUCCH resource 3 (h2 and h3) are resources selected by ARI indicated by the PDCCH indicating the SCell PDSCH.

Next, FIG. 7A illustrates a method of mapping error detection result patterns when there are two component carriers (one PCell and one SCell) in a TDD system.

As with FIG. 6, FIG. 7A assumes a case where the transmission mode is set to one of (a), (b) and (c) below.

Furthermore, FIG. 7A assumes a case where number M is set in one of (1) to (4) below, M indicating how many downlink communication subframes per component carrier (hereinafter, described as "DL (DownLink) subframes," "D" or "S" shown in FIG. 3) of results of error detection need to be reported to the base station using one uplink communication subframe (hereinafter, described as "UL (UpLink) subframe," "U" shown in FIG. 3). For example, in Config 2 shown in FIG. 3, since results of error detection of four DL subframes are reported to the base station using one UL subframe, M=4.

(1) M=1
(2) M=2
(3) M=3
(4) M=4

That is, FIG. 7A illustrates a method of mapping a pattern for results of error detection when (a) to (c) above are combined with (1) to (4) above. The value of M varies depending on UL-DL configuration (Config 0 to 6) and subframe number (SF#0 to SF#9) in one frame as shown in FIG. 3. Furthermore, in Config 5 shown in FIG. 3, M=9 in subframe (SF) #2. However, in this case, in the LTE-A TDD system, the terminal does not apply channel selection and reports the results of error detection using, for example, a DFT-S-OFDM format. For this reason, in FIG. 7A, Config 5 (M=9) is not included in the combination.

In the case of (1), the number of error detection result patterns is $2^2 \times 1=4$ patterns, $2^3 \times 1=8$ patterns and $2^4 \times 1=16$ patterns in order of (a), (b) and (c). In the case of (2), the number of error detection result patterns is $2^2 \times 2=8$ patterns, $2^3 \times 2=16$ patterns, $2^4 \times 2=32$ patterns in order of (a), (b) and (c). The same applies to (3) and (4).

Here, it is assumed that the phase difference between phase points to be mapped in one PUCCH resource is 90 degrees at minimum (that is, a case where a maximum of 4 patterns per PUCCH resource are mapped). In this case, the number of PUCCH resources necessary to map all error detection result patterns is $2^4 \times 4 \div 4=16$ in (4) and (c) when the number of error detection result patterns is a maximum ($2^4 \times 4=64$ patterns), which is not realistic. Thus, the TDD system intentionally reduces the amount of information on the results of error detection by bundling the results of error detection in a spatial region or further in a time domain if necessary. In this way, the TDD system limits the number of PUCCH resources necessary to report the error detection result patterns.

In the LTE-A TDD system, in the case of (1), the terminal maps 4 patterns, 8 patterns and 16 patterns of results of error detection in order of (a), (b) and (c) to 2, 3 and 4 PUCCH resources respectively without bundling the results of error detection (Step 3 in FIG. 7A). That is, the terminal reports an error detection result using 1 bit per component carrier in which a transmission mode (non-MIMO) supporting only one-codeword (CW) transmission in downlink and reports error detection results using 2 bits per component carrier in which a transmission mode (MIMO) supporting up to two-CW transmissions in downlink.

In the LTE-A TDD system, in the cases of (2) and (a), the terminal maps eight patterns of results of error detection to four PUCCH resources without bundling the results of error detection (Step 3 in FIG. 7A). In that case, the terminal reports error detection results using 2 bits per downlink component carrier.

In the LTE-A TDD system, in the cases of (2) and (b) (the same applies to (2) and (c)), the terminal bundles the results of error detection of component carriers in which a transmission mode supporting up to two-CW transmission in downlink is set in a spatial region (spatial bundling) (Step 1 in FIG. 7A). In the spatial bundling, when the result of error detection corresponding to at least one CW of two CWs of the results of error detection is NACK, the terminal determines the results of error detection after the spatial bundling to be NACK. That is, in spatial bundling, Logical AND of the results of error detection of two CWs is taken. The terminal then maps error detection result patterns after spatial bundling (8 patterns in the cases of (2) and (b), 16 patterns in the cases of (2) and (c)) to four PUCCH resources (Step 3 in FIG. 7A). In that case, the terminal reports error detection results using 2 bits per downlink component carrier.

In the LTE-A TDD system, in the cases of (3) or (4), and (a), (b) or (c), the terminal performs bundling in the time domain (time-domain bundling) after the spatial bundling (Step 1) (Step 2 in FIG. 7A). The terminal then maps the error detection result patterns after the time-domain bundling to four PUCCH resources (Step 3 in FIG. 7A). In that case, the terminal reports results of error detection using 2 bits per downlink component carrier.

Next, an example of more specific mapping methods will be described with reference to FIG. 7B. FIG. 7B shows an example of a case where the number of downlink component carriers is 2 (one PCell, one SCell) and a case where "(c) a transmission mode in which each component carrier supports up to downlink two-CW transmission" is set and a case with "(4) M=4."

In FIG. 7B, the results of error detection of a PCell are (ACK (A), ACK), (ACK, ACK), (NACK (N), NACK) and (ACK, ACK) in order of (CW0, CW1) in four DL subframes (SF1 to 4). In the PCell shown in FIG. 7B, M=4, and therefore the terminal spatially bundles these subframes in Step 1 in FIG. 7A (portions enclosed by a solid line in FIG. 7B). As a result of the spatial bundling, ACK, ACK, NACK and ACK are obtained in that order in four DL subframes of the PCell shown in FIG. 7B. Furthermore, in Step 2 in FIG. 7A, the terminal applies time-domain bundling to the 4-bit error detection result pattern (ACK, ACK, NACK, ACK) after spatial bundling obtained in Step 1 (portions enclosed by broken line in FIG. 7B). In this way, a 2-bit error detection result of (NACK, ACK) is obtained in the PCell shown in FIG. 7B.

The terminal likewise applies spatial bundling and time-domain bundling also for the SCell shown in FIG. 7B and thereby obtains a 2-bit error detection result (NACK, NACK).

The terminal then combines the error detection result patterns using 2 bits each after time-domain bundling of the PCell and SCell in Step 3 in FIG. 7A in order of the PCell, SCell to bundle them into a 4-bit error detection result pattern (NACK, ACK, NACK, NACK). The terminal determines a PUCCH resource (in this case, h1) and a phase point (in this case, −j) using the mapping table shown in Step 3 in FIG. 7A from this 4-bit error detection result pattern.

The method of determining PUCCH resources is similar to that of the FDD system, and, for example, in (c), PUCCH resource 0 and PUCCH resource 1 (h0 and h1) are resources associated in a one-to-one correspondence with the top CCE index and the next index ($n_{CCE}$ and $n_{CCE}+1$) occupied by the PDCCH indicating PCell PDSCH, and PUCCH resource 2 and PUCCH resource 3 (h2 and h3) are resources selected by ARI indicated by PDCCH indicating SCell PDSCH.

However, there is a period (uncertainty period or misalignment period) during which the recognition as to the number of CCs configured in the terminal varies irrespective of whether the system is an FDD system or TDD system. The base station reports a message for reconfiguration to the terminal to change the number of CCs, and upon receiving the report, the terminal recognizes that the number of CCs has been changed and reports a message indicating completion of reconfiguration of the number of CCs to the base station. The existence of a period of time during which there is a difference in the recognition of the number of CCs configured in the terminal is attributable to the fact that it is not until the base station receives the report that the base station recognizes that the number of CCs configured in the terminal has been changed.

For example, when the terminal recognizes that the number of CCs configured is 1, while the base station recognizes that the number of CCs configured in the terminal is 2, the terminal sends a response signal corresponding to the data received by the terminal using mapping of error detection result patterns corresponding to one CC. On the other hand, the base station determines a response signal from the terminal corresponding to the data sent to the terminal using mapping of error detection result patterns corresponding to two CCs.

In the case of one CC, mapping of error detection result patterns for one CC used for the LTE system is used to secure backward compatibility with the LTE system (hereinafter, may also be described as "LTE fallback"). When one CC is one-CW processing, ACK is BPSK-mapped to phase point (−1, 0) and NACK is BPSK-mapped to phase point (1, 0) (hereinafter may be expressed as "fallback to Format1a"). When one CC is two-CW processing, ACK/ACK is QPSK-mapped to phase point (−1, 0), ACK/NACK is QPSK-mapped to phase point (0, 1), NACK/ACK is QPSK-mapped to phase point (0, −1) and NACK/NACK is QPSK-mapped to phase point (1, 0) (hereinafter may be expressed as "fallback to Format1b").

To be more specific, when the terminal recognizes that the number of CCs is one, while the base station recognizes that the number of CCs configured in the terminal is two, a case will be described as an example where the base station uses two CCs, and sends to the terminal, data with one CW for PCell and one CW for SCell. Since the terminal recognizes that the number of CCs configured is one, the terminal receives only PCell. Upon succeeding in receiving downlink data in PCell, the terminal uses phase point (−1, 0) in a PUCCH resource (PUCCH resource 0) in the uplink component carrier associated (implicit-signaled) in a one-to-one correspondence with the top CCE index of the CCE occupied by the PDCCH indicating the PCell PDSCH. On the other hand, since the base station recognizes that the number of CCs configured in the terminal is two, the base station determines a response signal using the mapping in FIG. 6A. That is, the base station can determine, from phase point (−1, 0) of PUCCH resources 0, that one CW of PCell is ACK and one CW of SCell is NACK or DTX. Similarly, when the terminal fails to receive downlink data in PCell, the terminal needs to perform mapping to phase point (1, 0).

The same applies to a case where the recognition by the terminal and the base station is opposite to that in the above-described example. That is, when the terminal recognizes that the number of CCs configured is two while the base station recognizes that the number of CCs configured is one, this is a case where the base station sends one-CW data in PCell to the terminal using one CC. Since the terminal recognizes that the number of CCs configured is two, the terminal receives PCell and SCell. When the terminal succeeds in receiving downlink data in PCell, the base station expects the PUCCH resource (PUCCH resource 0) in an uplink component carrier associated (implicit-signaled) in a one-to-one correspondence with the top CCE index of CCEs occupied by the PDCCH indicating the PDSCH in PCell to receive phase point (−1, 0). Therefore, even if the terminal recognizes that the number of CCs is two, when one CW of PCell is ACK and SCell is DTX, the terminal needs to perform mapping to phase point (−1, 0) of PUCCH resource 0 as shown in FIG. 6A. Similarly, when the terminal fails to receive downlink data in PCell, the terminal needs to perform mapping to phase point (1, 0).

Thus, even when the recognition of the number of CCs configured in the terminal differs between the base station and the terminal, it is necessary to be able to correctly determine response signals of PCell and SCell (hereinafter, may also be expressed as "supporting LTE fallback") and FDD mapping supports fallback to Format1a when PCell is set to a transmission mode that supports only downlink one-CW transmission and supports fallback to Format1b when PCell is set to a transmission mode that supports up to downlink two-CW transmission. TDD mapping always supports fallback to Format1a. In general, when PCell and SCell are configured in the terminal, a band (cell) used by a base station having a wide coverage area is assumed to be PCell and a band (cell) used by a base station having a narrow coverage area is assumed to be SCell irrespective of whether the system is an FDD system or a TDD system. LTE-Advanced assumes carrier aggregation among macro cells (macro eNBs) having a wide coverage area. For this reason, SCell for a certain terminal can be operated as PCell for another terminal, and therefore even if each terminal always sends PUCCH using PCell, it is possible to balance PUCCH overhead among macro cells.

LTE-Advanced further assumes carrier aggregation in a HetNet (Heterogeneous Network) environment that combines a macro cell having a large coverage area covered by macro eNB and a picocell having a small coverage area covered by a pico eNB as shown in FIG. 8. In this case, for many terminals, a band (CC) used by a macro cell having a large coverage is operated as PCell and a band (CC) used by a picocell having a narrow coverage is operated as SCell. That is, since there are many terminals that operate the macro cell shown in FIG. 8 as PCell, there is a concern that PUCCH overhead in the macro cell may increase as the number of terminals increases or downlink data communication in terminals increases. In a HetNet environment, the distance between a terminal and pico eNB is generally smaller than the distance between a terminal and macro eNB. Therefore, transmitting PUCCH to pico eNB which has a smaller distance from the terminal is advantageous in terms of a reduction of transmission power in the terminal and reduction of interference with other terminals.

In view of the above-described circumstances, in carrier aggregation in a HetNet environment, there is a high possibility that PUCCH transmission needs to be performed using SCell rather than PCell.

Since performing PUCCH transmission using SCell presupposes that carrier aggregation be configured, the terminal is assumed to make a connection using PCell (performs PUCCH transmission using PCell for that purpose) first and perform operation of switching between CCs (PUCCH transmission cells) through which PUCCH is transmitted from PCell to SCell based on an instruction from the base station.

As the method of switching between PUCCH transmission cells, two methods may be used. One is a configuration-based method and the other is an assignment-based method.

The configuration-based method is a method whereby PUCCH transmission cells are switched through RRC signaling by a base station.

The assignment-based method is a method whereby PUCCH transmission cells are switched in accordance with a combination of cells to which a base station assigns a downlink data channel (PDSCH). For this reason, PUCCH transmission cells dynamically vary in subframe units. For example, when only PDSCH is assigned in PCell, PUCCH is transmitted using PCell to secure mobility of the terminal. On the other hand, when only PDSCH is assigned in SCell, PUCCH is transmitted using SCell to reduce PUCCH overhead, PUCCH transmission power and interference. When PDSCHs are simultaneously assigned in PCell and SCell, PUCCH is transmitted using PCell or SCell depending on the purpose.

CITATION LIST

Non-Patent Literature

NPL 1
3GPP TS 36.211 V10.4.0, "Physical Channels and Modulation (Release 10)," December 2011
NPL 2
3GPP TS 36.212 V10.5.0, "Multiplexing and channel coding (Release 10)," March 2012
NPL 3
3GPP TS 36.213 V10.5.0, "Physical layer procedures (Release 10)," March 2012
NPL 4
Seigo Nakao, Tomofumi Takata, Daichi Imamura, and Katsuhiko Hiramatsu, "Performance enhancement of E-UTRA uplink control channel in fast fading environments," Proceeding of IEEE VTC 2009 spring, April. 2009
NPL 5
Ericsson and ST-Ericsson, "A/N transmission in the uplink for carrier aggregation," R1-100909, 3GPP TSG-RAN WG1 #60, February 2010
NPL 6
ZTE, 3GPP RAN1 meeting #57, R1-091702, "Uplink Control Channel Design for LTE-Advanced," May 2009

NPL 7
Panasonic, 3GPP RAN1 meeting #57, R1-091744, "UL ACK/NACK transmission on PUCCH for Carrier aggregation," May 2009

SUMMARY OF INVENTION

Technical Problem

As described above, according to the assignment-based PUCCH transmission cell switching method, PUCCH transmission cells are switched in accordance with a combination of cells to which the base station assigns a downlink data channel (PDSCH).

FIG. 9 illustrates an example of a case where a terminal transmits PUCCH using PCell when only PDSCH of PCell is assigned, transmits PUCCH using SCell when only PDSCH of SCell is assigned and transmits PUCCH using PCell or SCell when PDSCHs are simultaneously assigned in PCell and SCell.

In the operation example as shown in FIG. 9, for example, in FIG. 6C or Step 3 in FIG. 7, PUCCH resources 0 and 1 (h0 and h1) become PUCCH resources in PCell and PUCCH resources 2 and 3 (h2 and h3) become PUCCH resources in SCell.

Therefore, when the base station simultaneously assigns PDSCHs in PCell and SCell, the terminal selects PUCCH resources based on a mapping rule shown in FIG. 6C or Step 3 in FIG. 7, and therefore the base station cannot know a cell (CC), a PUCCH resource of which is used to transmit an error detection result. Thus, the base station needs to detect both PUCCHs of PCell and SCell and detect which cell (CC) is used by the terminal to transmit the error detection result based on a comparison in receiving power of PUCCH.

However, since communication paths (channel environment) are different between PCell and SCell, channel states are also different. Thus, even if transmission power control is performed appropriately in both cells of PCell and SCell, receiving quality of PUCCH differs between PCell and SCell due to a fluctuation in the channel states. As a result, comparison of receiving power of PUCCH is not performed correctly in the base station and it is not possible to detect error detection results (ACK/NACK) correctly. That is, ACK/NACK detection is performed across PCell and SCell, which causes accuracy deterioration in ACK/NACK detection.

An object of the present invention is to provide, when ARQ is applied to communication using a plurality of downlink component carriers and a plurality of uplink component carriers and when uplink component carriers that transmit uplink control information are switched, a terminal apparatus and a transmission method capable of reducing deterioration in detection accuracy of uplink control information in a base station, by reducing the possibility that uplink control information in the base station may be detected by a plurality of uplink component carriers while avoiding inconsistency of recognition between the base station and the terminal in the middle of switching of the number of downlink component carriers configured.

Solution to Problem

A terminal apparatus according to an aspect of the present invention is a terminal apparatus that communicates with a base station apparatus using a plurality of component carriers, the terminal apparatus including: a generating section that generates a response signal using an error detection result of each piece of downlink data transmitted using the plurality of component carriers; and a control section that transmits the response signal using an uplink control channel based on a mapping rule, in which: the mapping rule associates a pattern candidate of the error detection result with a plurality of resources of the uplink control channel used for transmission of the response signal and phase points in each resource; a first resource among the plurality of resources is associated with at least a first pattern candidate in which a pattern of a specific error detection result corresponding to downlink data of a first component carrier is identical to a pattern of an error detection result when communication with the base station apparatus is performed using only the first component carrier, and all error detection results other than the specific error detection result are NACK or DTX; a phase point associated with the first pattern candidate is identical to a phase point associated with an error detection result pattern when communication with the base station apparatus is performed using only the first component carrier; and at least the first resource among the plurality of resources is allocated for the first component carrier.

A transmission method according to an aspect of the present invention is a transmission method for a terminal apparatus that communicates with a base station apparatus using a plurality of component carriers, the method including: generating a response signal using an error detection result of each piece of downlink data transmitted using the plurality of component carriers; and transmitting the response signal using an uplink control channel based on a mapping rule; in which: the mapping rule associates a pattern candidate of the error detection result with a plurality of resources of the uplink control channel used for transmission of the response signal and phase points in each resource; a first resource among the plurality of resources is associated with at least a first pattern candidate in which a pattern of a specific error detection result corresponding to downlink data of a first component carrier is identical to an error detection result pattern when communication with the base station apparatus is performed using only the first component carrier, and all error detection results other than the specific error detection result are NACK or DTX; a phase point associated with the first pattern candidate is identical to a phase point associated with an error detection result pattern when communication with the base station apparatus is performed using only the first component carrier; and at least the first resource among the plurality of resources is allocated for the first component carrier.

Advantageous Effects of Invention

According to the present invention, when ARQ is applied to communication using a plurality of downlink component carriers and a plurality of uplink component carriers and when uplink component carriers that transmit uplink control information are switched, it is possible to prevent deterioration in detection accuracy of uplink control information in a base station by reducing the possibility that a plurality of uplink component carriers may detect uplink control information in the base station while preventing inconsistency of recognition between the base station and terminals in the middle of switching of the number of downlink component carriers configured.

BRIEF DESCRIPTION OF DRAWINGS

FIG. 5 is a diagram provided for describing channel selection;

FIGS. 6A to 6C are diagrams provided for describing a mapping method in FDD;

FIGS. 7A and 7B are diagrams provided for describing a bundling method and a mapping method in TDD;

FIG. 9 is a diagram provided for describing a terminal operation corresponding to PDSCH assignment in each cell;

FIG. 13 is a diagram provided for describing a probability of occurrence of each ACK/NACK and PUCCH resources according to Embodiment 1 of the present invention;

FIG. 14 is a diagram provided for describing a probability of occurrence of each ACK/NACK according to Embodiment 2 of the present invention;

FIG. 15 is a diagram provided for describing a probability of occurrence of each ACK/NACK and PUCCH resources according to Embodiment 2 of the present invention;

FIG. 16 is a diagram provided for describing a probability of occurrence of each ACK/NACK and PUCCH resources according to Embodiment 3 of the present invention; and FIG. 17 is a diagram provided for describing a probability of occurrence of each ACK/NACK and PUCCH resources according to Embodiment 4 of the present invention.

DESCRIPTION OF EMBODIMENTS

Figure 1:
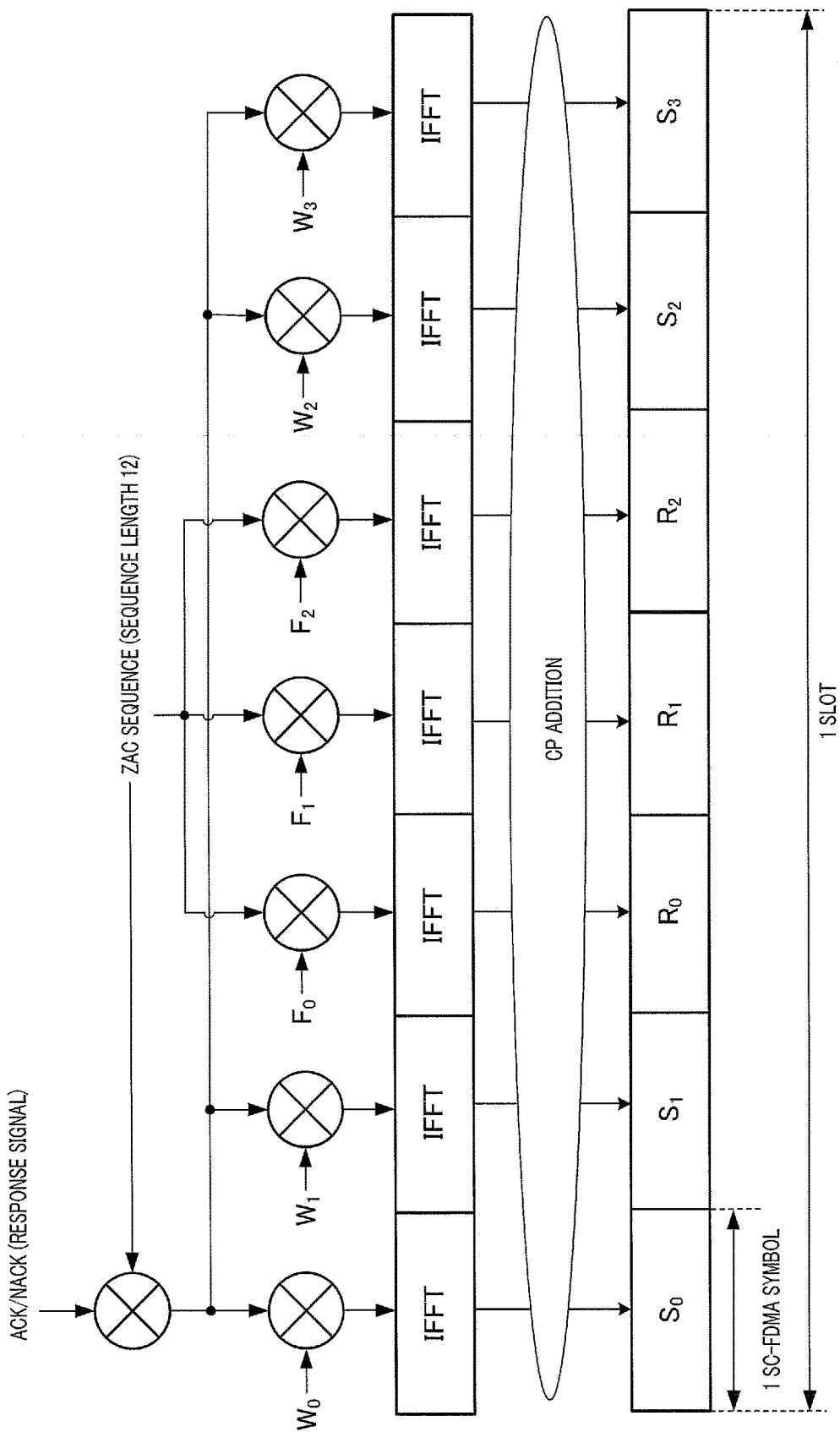
FIG. 1 is a diagram illustrating a method of spreading response signals and reference signals.
Figure 2:
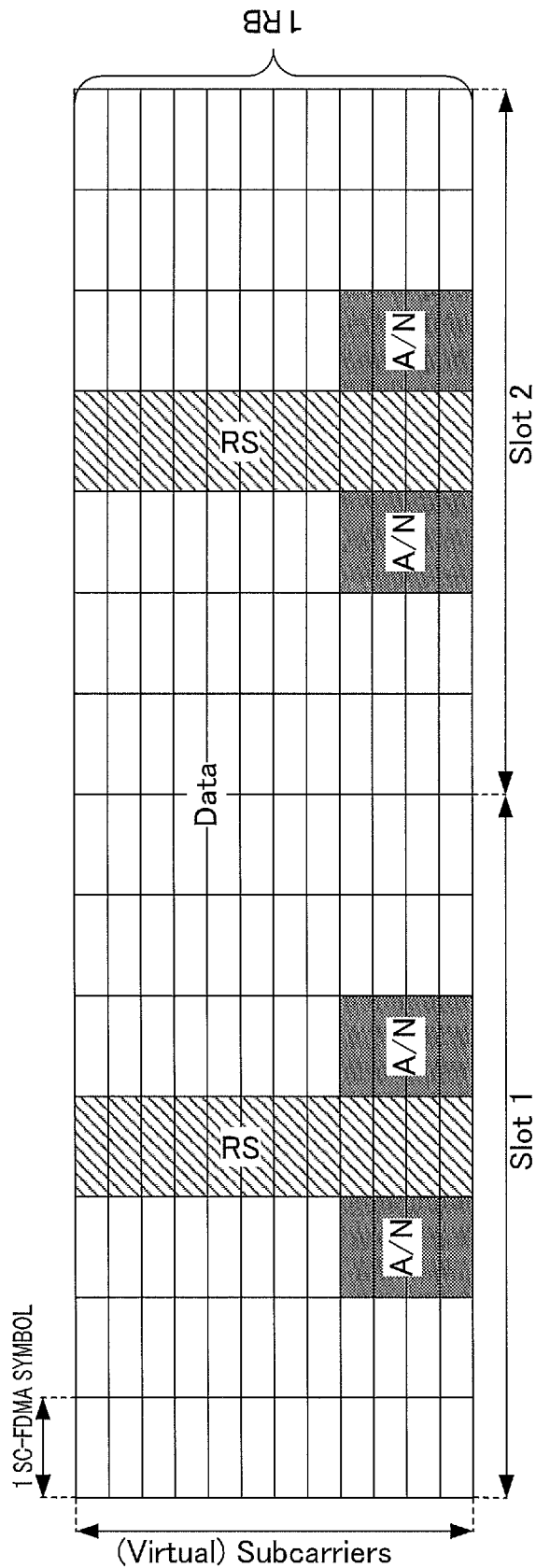
FIG. 2 is a diagram illustrating an operation related to a case where TDM is applied to response signals and uplink data on PUSCH resources.
Figure 3:
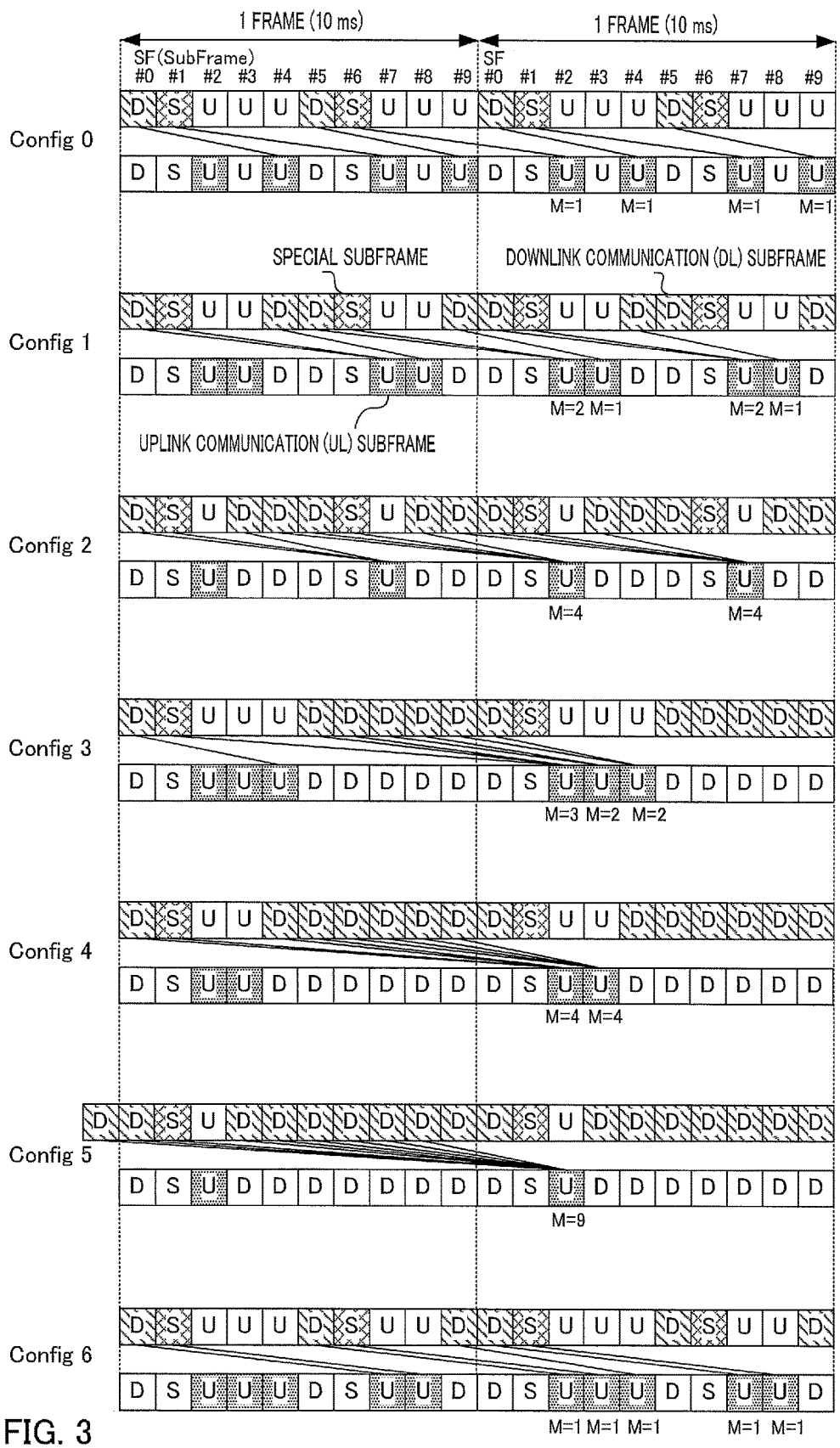
FIG. 3 is a diagram provided for describing a UL-DL configuration in TDD.
Figure 4B:
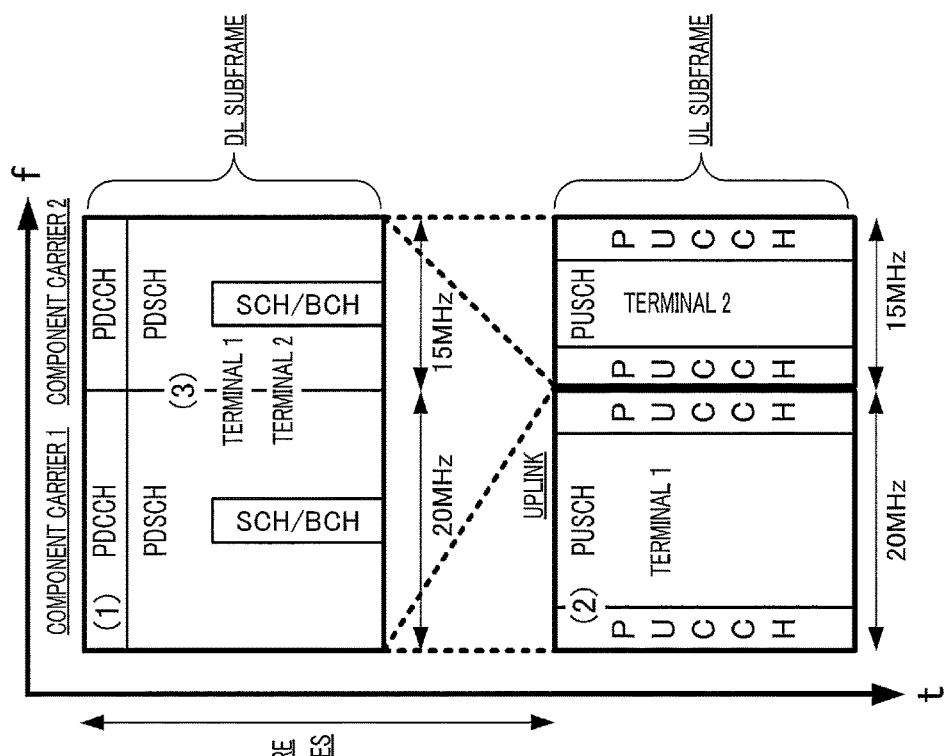
FIGS. 4A and 4B are diagrams provided for describing asymmetric carrier aggregation and a control sequence applied to individual terminals.
Figure 4A:
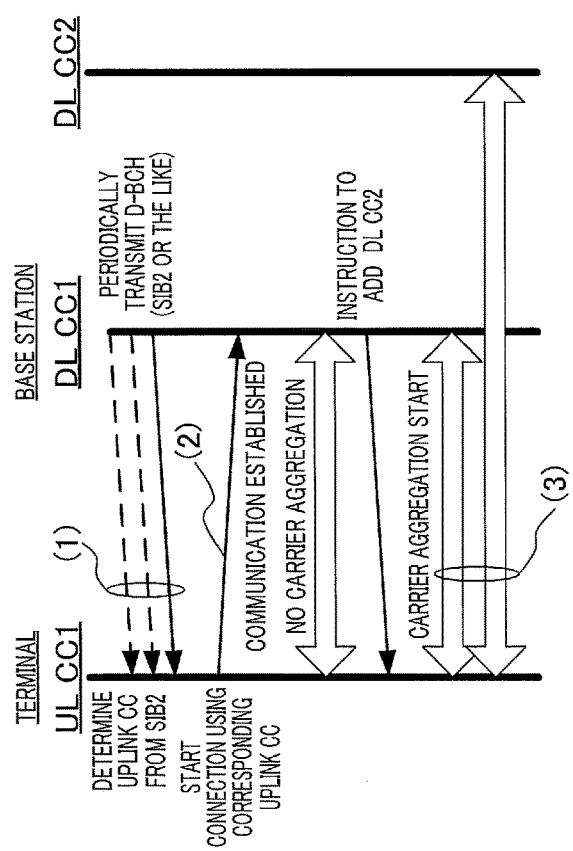
Figure 8:
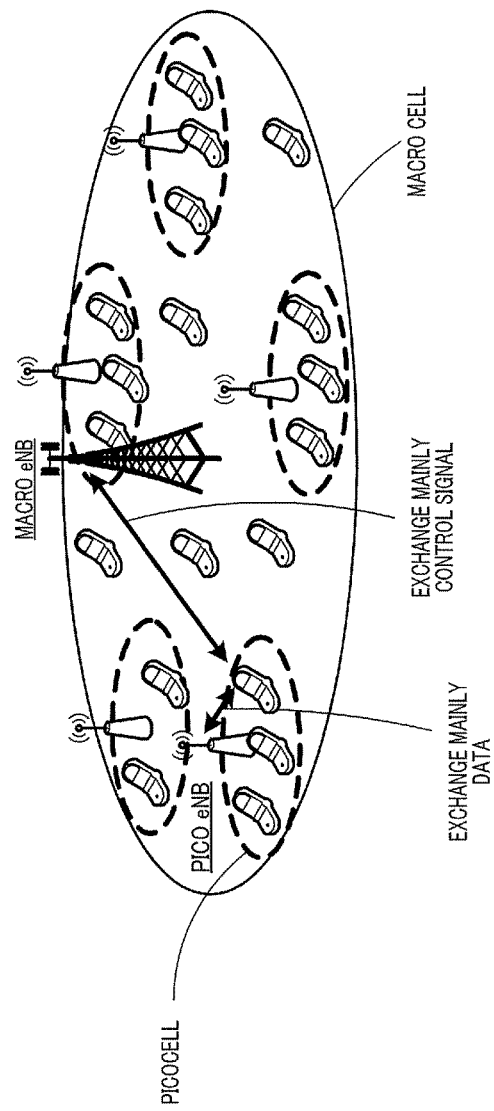
FIG. 8 is a diagram provided for describing carrier aggregation in a HetNet environment.

Hereinafter, embodiments of the claimed invention will be described in detail with reference to the accompanying drawings. Throughout the embodiments, the same elements are assigned the same reference numerals and any duplicate description of the elements is omitted.

Embodiment 1

A communication system according to the present embodiment is, for example, an LTE-A system and includes base station 100 and terminal 200. Base station 100 is, for example, a base station compliant with the LTE-A system and terminal 200 is, for example, a terminal compliant with the LTE-A system.

Figure 10:
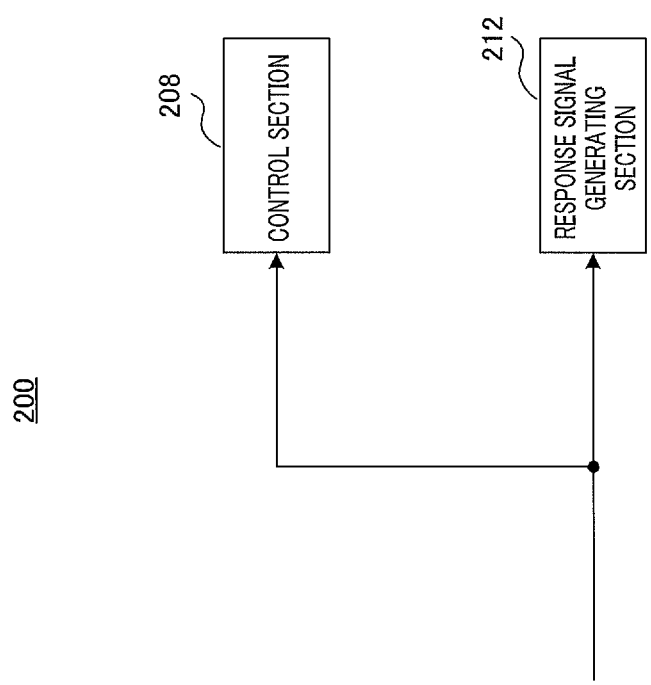
FIG. 10 is a block diagram illustrating a main configuration of a terminal according to Embodiment 1 of the present invention.

FIG. 10 is a block diagram illustrating a main configuration of terminal 200 according to the present embodiment.

Terminal 200 shown in FIG. 10 communicates with base station 100 using a plurality of CCs. In terminal 200, response signal generating section 212 generates a response signal using an error detection result of each piece of downlink data transmitted by a plurality of CCs and control section 208 transmits the response signal using an uplink control channel based on a mapping rule.

According to the above-described mapping rule, pattern candidates of error detection results are associated with a plurality of resources of an uplink control channel used for transmission of a response signal and a phase point in each resource, a first resource among the plurality of resources is associated with at least a specific pattern candidate in which a pattern of a specific error detection result corresponding to downlink data of a first component carrier is identical to the error detection result pattern when communicating with base station 100 using only the first component carrier (that is, operation compliant with the LTE system) and all error detection results other than the specific error detection result are NACK or DTX, a phase point with which the specific pattern candidate is associated is identical to the phase point with which the error detection result pattern when communicating with base station 100 using only the first component carrier is associated, and at least the first resource among the above-described plurality of resources is arranged in the first component carrier (e.g., PCell).

(Configuration of Base Station)

Figure 11:
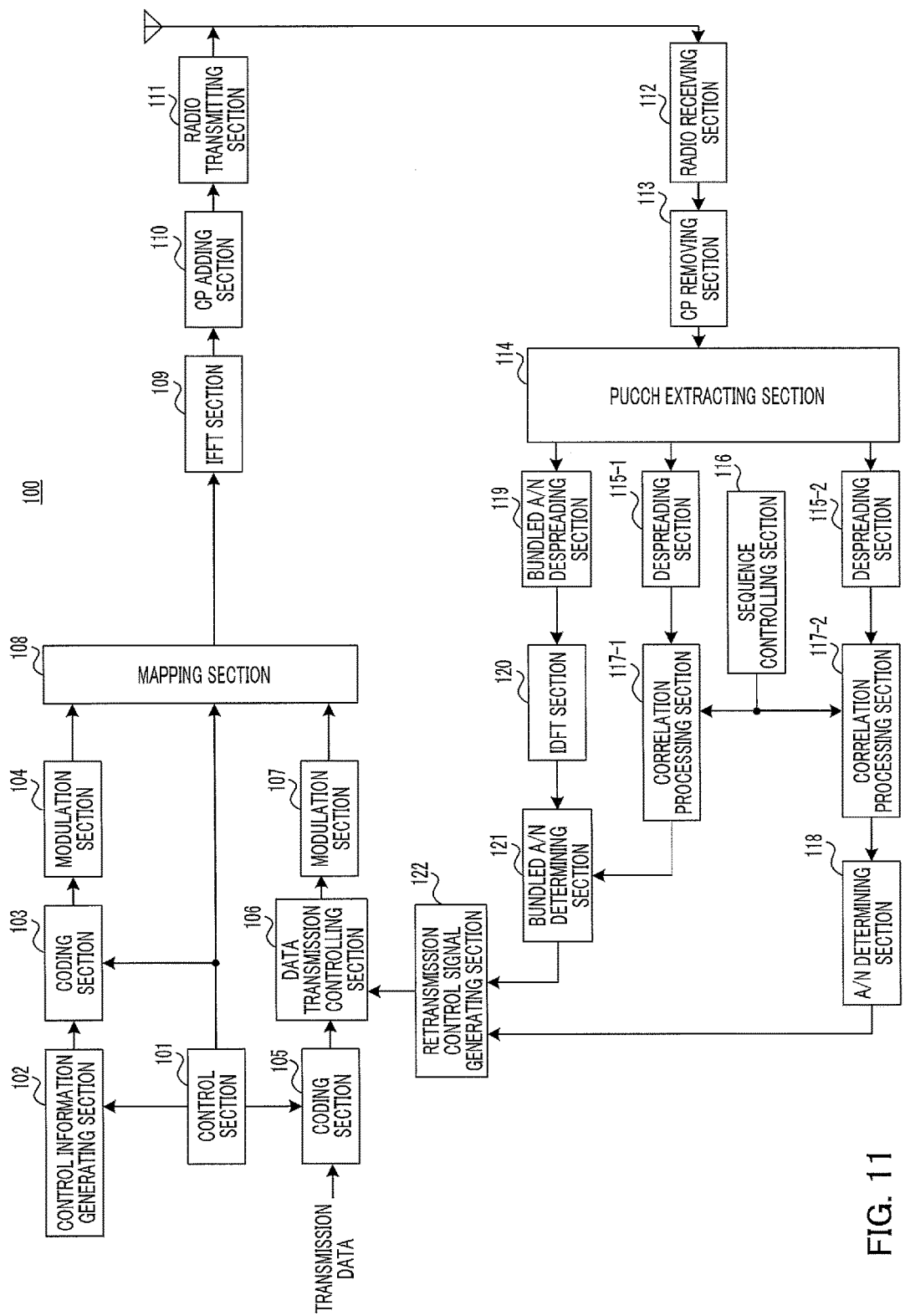
FIG. 11 is a block diagram illustrating a configuration of a base station according to Embodiment 1 of the present invention.

FIG. 11 is a configuration diagram of base station 100 according to Embodiment 1 of the claimed invention. In FIG. 11, base station 100 includes control section 101, control information generating section 102, coding section 103, modulation section 104, coding section 105, data transmission controlling section 106, modulation section 107, mapping section 108, inverse fast Fourier transform (IFFT) section 109, CP adding section 110, radio transmitting section 111, radio receiving section 112, CP removing section 113, PUCCH extracting section 114, despreading section 115, sequence controlling section 116, correlation processing section 117, A/N determining section 118, bundled A/N despreading section 119, inverse discrete Fourier transform (IDFT) section 120, bundled A/N determining section 121 and retransmission control signal generating section 122.

Control section 101 assigns a downlink resource for transmitting control information (i.e., downlink control information assignment resource) and a downlink resource for transmitting downlink data (i.e., downlink data assignment resource) for a resource assignment target terminal (hereinafter, referred to as "destination terminal" or simply "terminal") 200. This resource assignment is performed in a downlink component carrier included in a component carrier group configured for resource assignment target terminal 200. In addition, the downlink control information assignment resource is selected from among the resources corresponding to downlink control channel (i.e., PDCCH) in each downlink component carrier. Moreover, the downlink data assignment resource is selected from among the resources corresponding to downlink data channel (i.e., PDSCH) in each downlink component carrier. In addition, when there are a plurality of resource assignment target terminals 200, control section 101 assigns different resources to resource assignment target terminals 200, respectively.

The downlink control information assignment resources are equivalent to L1/L2 CCH described above. More specifically, the downlink control information assignment resources are each formed of one or a plurality of CCEs.

Control section 101 determines the coding rate used for transmitting control information to resource assignment target terminal 200. The data size of the control information varies depending on the coding rate. Thus, control section 101 assigns a downlink control information assignment resource having the number of CCEs that allows the control information having this data size to be mapped to the resource.

Control section 101 outputs information on the downlink data assignment resource to control information generating section 102. Moreover, control section 101 outputs information on the coding rate to coding section 103. In addition, control section 101 determines and outputs the coding rate of transmission data (i.e., downlink data) to coding section 105. Moreover, control section 101 outputs information on the downlink data assignment resource and downlink control information assignment resource to mapping section 108. However, control section 101 controls the assignment in such a way that the downlink data and downlink control information for the downlink data are mapped to the same downlink component carrier.

Control information generating section 102 generates and outputs control information including the information on the downlink data assignment resource to coding section 103. This control information is generated for each downlink component carrier. In addition, when there are a plurality of resource assignment target terminals 200, the control information includes the terminal ID of each destination terminal 200 in order to distinguish resource assignment target terminals 200 from one another. For example, the control information includes CRC bits masked by the terminal ID of destination terminal 200. This control information may be referred to as "control information carrying downlink assignment" or "downlink control information (DCI)."

Coding section 103 encodes the control information using the coding rate received from control section 101 and outputs the coded control information to modulation section 104.

Modulation section 104 modulates the coded control information and outputs the resultant modulation signals to mapping section 108.

Coding section 105 uses the transmission data (i.e., downlink data) for each destination terminal 200 and the coding rate information from control section 101 as input and encodes and outputs the transmission data to data transmission controlling section 106. However, when a plurality of downlink component carriers are assigned to destination terminal 200, coding section 105 encodes each piece of transmission data to be transmitted on a corresponding one of the downlink component carriers and transmits the coded pieces of transmission data to data transmission controlling section 106.

Data transmission controlling section 106 outputs the coded transmission data to modulation section 107 and also keeps the coded transmission data at the initial transmission. In addition, data transmission controlling section 106 keeps the transmission data for one destination terminal 200 for each downlink component carrier on which the transmission data is transmitted. Thus, it is possible to perform not only retransmission control for overall data transmitted to destination terminal 200, but also retransmission control for data on each downlink component carrier.

Furthermore, upon reception of a NACK or DTX for downlink data transmitted on a certain downlink component carrier from retransmission control signal generating section 122, data transmission controlling section 106 outputs the data kept in the manner described above and corresponding to this downlink component carrier to modulation section 107. Upon reception of an ACK for the downlink data transmitted on a certain downlink component carrier from retransmission control signal generating section 122, data transmission controlling section 106 deletes the data kept in the manner described above and corresponding to this downlink component carrier.

Modulation section 107 modulates the coded transmission data received from data transmission controlling section 106 and outputs the resultant modulation signals to mapping section 108.

Mapping section 108 maps the modulation signals of the control information received from modulation section 104 to the resource indicated by the downlink control information assignment resource received from control section 101 and outputs the resultant modulation signals to IFFT section 109.

Mapping section 108 maps the modulation signals of the transmission data received from modulation section 107 to the resource (i.e., PDSCH (i.e., downlink data channel)) indicated by the downlink data assignment resource received from control section 101 (i.e., information included in the control information) and outputs the resultant modulation signals to IFFT section 109.

The control information and transmission data mapped to a plurality of subcarriers in a plurality of downlink component carriers in mapping section 108 is transformed into time-domain signals from frequency-domain signals in IFFT section 109, and CP adding section 110 adds a CP to the time-domain signals to form OFDM signals. The OFDM signals undergo transmission processing such as digital to analog (D/A) conversion, amplification and up-conversion and/or the like in radio transmitting section 111 and are transmitted to terminal 200 via an antenna.

Radio receiving section 112 receives, via an antenna, the uplink response signals or reference signals transmitted from terminal 200, and performs reception processing such as down-conversion, A/D conversion and/or the like on the uplink response signals or reference signals.

CP removing section 113 removes the CP added to the uplink response signals or reference signals from the uplink response signals or reference signals that have undergone the reception processing.

PUCCH extracting section 114 extracts, from the PUCCH signals included in the received signals, the signals in the PUCCH region corresponding to the bundled ACK/NACK resource previously indicated to terminal 200. The bundled ACK/NACK resource herein refers to a resource used for transmission of the bundled ACK/NACK signals and adopting the DFT-S-OFDM format structure. More specifically, PUCCH extracting section 114 extracts the data part of the PUCCH region corresponding to the bundled ACK/NACK resource (i.e., SC-FDMA symbols on which the bundled ACK/NACK resource is assigned) and the reference signal part of the PUCCH region (i.e., SC-FDMA symbols on which the reference signals for demodulating the bundled ACK/NACK signals are assigned). PUCCH extracting section 114 outputs the extracted data part to bundled A/N despreading section 119 and outputs the reference signal part to despreading section 115-1.

In addition, PUCCH extracting section 114 extracts, from the PUCCH signals included in the received signals, a plurality of PUCCH regions corresponding to an A/N resource associated with a CCE that has been occupied by the PDCCH used for transmission of the downlink assignment control information (DCI), and corresponding to a plurality of A/N resources previously indicated to terminal 200. The A/N resource herein refers to the resource to be used for transmission of an A/N. More specifically, PUCCH extracting section 114 extracts the data part of the PUCCH region corresponding to the A/N resource (i.e., SC-FDMA symbols on which the uplink control signals are assigned)

and the reference signal part of the PUCCH region (i.e., SC-FDMA symbols on which the reference signals for demodulating the uplink control signals are assigned). PUCCH extracting section 114 outputs both of the extracted data part and reference signal part to despreading section 115-2. In this manner, the response signals are received on the resource selected from the PUCCH resource associated with the CCE and the specific PUCCH resource previously indicated to terminal 200. A specific method of extracting A/N resources (PUCCH resources) will be described later.

Sequence controlling section 116 generates a base sequence that may be used for spreading each of the A/N reported from terminal 200, the reference signals for the A/N, and the reference signals for the bundled ACK/NACK signals (i.e., length-12 ZAC sequence). In addition, sequence controlling section 116 identifies a correlation window corresponding to a resource on which the reference signals may be assigned (hereinafter, referred to as "reference signal resource") in PUCCH resources that may be used by terminal 200. Sequence controlling section 116 outputs the information indicating the correlation window corresponding to the reference signal resource on which the reference signals may be assigned in bundled ACK/NACK resources and the base sequence to correlation processing section 117-1. Sequence controlling section 116 outputs the information indicating the correlation window corresponding to the reference signal resource and the base sequence to correlation processing section 117-1. In addition, sequence controlling section 116 outputs the information indicating the correlation window corresponding to the A/N resources on which an A/N and the reference signals for the A/N are assigned and the base sequence to correlation processing section 117-2.

Despreading section 115-1 and correlation processing section 117-1 perform processing on the reference signals extracted from the PUCCH region corresponding to the bundled ACK/NACK resource.

More specifically, despreading section 115-1 despreads the reference signal part using a Walsh sequence to be used in secondary-spreading for the reference signals of the bundled ACK/NACK resource by terminal 200 and outputs the despread signals to correlation processing section 117-1.

Correlation processing section 117-1 uses the information indicating the correlation window corresponding to the reference signal resource and the base sequence and thereby finds a correlation value between the signals received from despreading section 115-1 and the base sequence that may be used in primary-spreading in terminal 200. Correlation processing section 117-1 outputs the correlation value to bundled A/N determining section 121.

Despreading section 115-2 and correlation processing section 117-2 perform processing on the reference signals and A/Ns extracted from the plurality of PUCCH regions corresponding to the plurality of A/N resources.

More specifically, despreading section 115-2 despreads the data part and reference signal part using a Walsh sequence and a DFT sequence to be used in secondary-spreading for the data part and reference signal part of each of the A/N resources by terminal 200, and outputs the despread signals to correlation processing section 117-2.

Correlation processing section 117-2 uses the information indicating the correlation window corresponding to each of the A/N resources and the base sequence and thereby finds a correlation value between the signals received from despreading section 115-2 and a base sequence that may be used in primary-spreading by terminal 200. Correlation processing section 117-2 outputs each correlation value to A/N determining section 118.

A/N determining section 118 determines, on the basis of the plurality of correlation values received from correlation processing section 117-2, which of the A/N resources is used to transmit the signals from terminal 200 or none of the A/N resources is used. When determining that the signals are transmitted using one of the A/N resources from terminal 200, A/N determining section 118 performs coherent detection using a component corresponding to the reference signals and a component corresponding to the A/N and outputs the result of coherent detection to retransmission control signal generating section 122. Meanwhile, when determining that terminal 200 uses none of the A/N resources, A/N determining section 118 outputs the determination result indicating that none of the A/N resources is used to retransmission control signal generating section 122.

Bundled A/N despreading section 119 despreads, using a DFT sequence, the bundled ACK/NACK signals corresponding to the data part of the bundled ACK/NACK resource received from PUCCH extracting section 114 and outputs the despread signals to IDFT section 120.

IDFT section 120 transforms the bundled ACK/NACK signals in the frequency-domain received from bundled A/N despreading section 119 into time-domain signals by IDFT processing and outputs the bundled ACK/NACK signals in the time-domain to bundled A/N determining section 121.

Bundled A/N determining section 121 demodulates the bundled ACK/NACK signals corresponding to the data part of the bundled ACK/NACK resource received from IDFT section 120, using the reference signal information on the bundled ACK/NACK signals that is received from correlation processing section 117-1. In addition, bundled A/N determination section 121 decodes the demodulated bundled ACK/NACK signals and outputs the result of decoding to retransmission control signal generating section 122 as the bundled A/N information. However, when the correlation value received from correlation processing section 117-1 is smaller than a threshold, and bundled A/N determining section 121 thus determines that terminal 200 does not use any bundled A/N resource to transmit the signals, bundled A/N determining section 121 outputs the result of determination to retransmission control signal generating section 122.

Retransmission control signal generating section 122 determines whether or not to retransmit the data transmitted on the downlink component carrier (i.e., downlink data) on the basis of the information inputted from bundled A/N determining section 121 and the information inputted from A/N determining section 118 and generates retransmission control signals based on the result of determination. More specifically, when determining that downlink data transmitted on a certain downlink component carrier needs to be retransmitted, retransmission control signal generating section 122 generates retransmission control signals indicating a retransmission command for the downlink data and outputs the retransmission control signals to data transmission controlling section 106. In addition, when determining that the downlink data transmitted on a certain downlink component carrier does not need to be retransmitted, retransmission control signal generating section 122 generates retransmission control signals indicating not to retransmit the downlink data transmitted on the downlink component carrier and outputs the retransmission control signals to data transmission controlling section 106.

(Configuration of Terminal)

Figure 12:
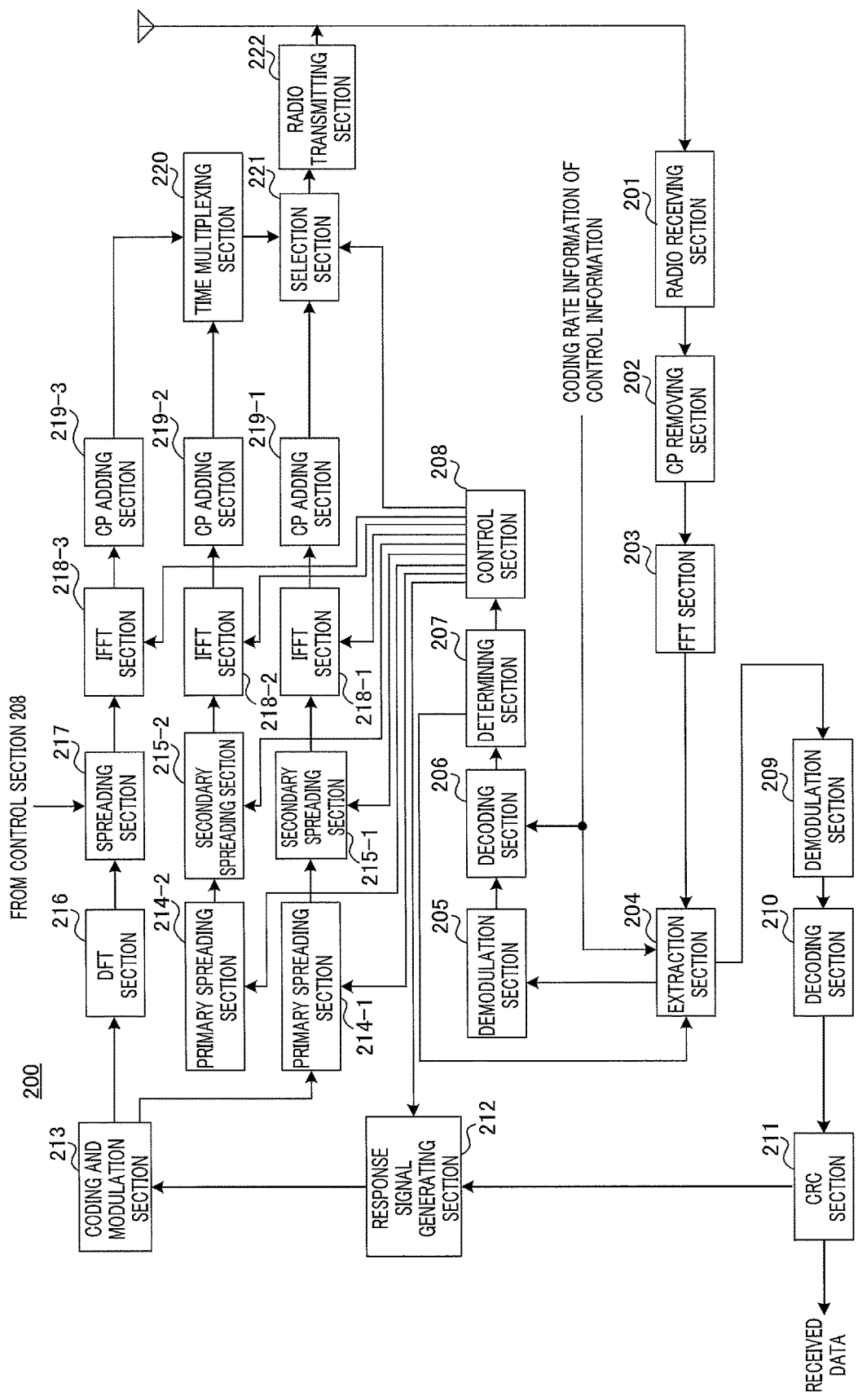
FIG. 12 is a block diagram illustrating a configuration of the terminal according to Embodiment 1 of the present invention.

FIG. 12 is a block diagram illustrating a configuration of terminal 200 according to Embodiment 1. In FIG. 12, terminal 200 includes radio receiving section 201, CP removing section 202, fast Fourier transform (FFT) section 203, extraction section 204, demodulation section 205, decoding section 206, determination section 207, control section 208, demodulation section 209, decoding section 210, CRC section 211, response signal generating section 212, coding and modulation section 213, primary-spreading sections 214-1 and 214-2, secondary-spreading sections 215-1 and 215-2, DFT section 216, spreading section 217, IFFT sections 218-1, 218-2 and 218-3, CP adding sections 219-1, 219-2 and 219-3, time-multiplexing section 220, selection section 221 and radio transmitting section 222.

Radio receiving section 201 receives, via an antenna, OFDM signals transmitted from base station 100 and performs reception processing such as down-conversion, A/D conversion and/or the like on the received OFDM signals. It should be noted that, the received OFDM signals include PDSCH signals assigned to a resource in a PDSCH (i.e., downlink data), or PDCCH signals assigned to a resource in a PDCCH.

CP removing section 202 removes a CP that has been added to the OFDM signals from the OFDM signals that have undergone the reception processing.

FFT section 203 transforms the received OFDM signals into frequency-domain signals by FFT processing and outputs the resultant received signals to extraction section 204.

Extraction section 204 extracts, from the received signals to be received from FFT section 203, downlink control channel signals (i.e., PDCCH signals) in accordance with coding rate information to be received. More specifically, the number of CCEs (or R-CCEs) forming a downlink control information assignment resource varies depending on the coding rate. Thus, extraction section 204 uses the number of CCEs that corresponds to the coding rate as units of extraction processing, and extracts downlink control channel signals. In addition, the downlink control channel signals are extracted for each downlink component carrier. The extracted downlink control channel signals are outputted to demodulation section 205.

Extraction section 204 extracts downlink data (i.e., downlink data channel signals (i.e., PDSCH signals)) from the received signals on the basis of information on the downlink data assignment resource intended for terminal 200 to be received from determination section 207 to be described, hereinafter, and outputs the downlink data to demodulation section 209. As described above, extraction section 204 receives the downlink assignment control information (i.e., DCI) mapped to the PDCCH and receives the downlink data on the PDSCH.

Demodulation section 205 demodulates the downlink control channel signals received from extraction section 204 and outputs the obtained result of demodulation to decoding section 206.

Decoding section 206 decodes the result of demodulation received from demodulation section 205 in accordance with the received coding rate information and outputs the obtained result of decoding to determination section 207.

Determination section 207 performs blind-determination (i.e., monitoring) to find out whether or not the control information included in the result of decoding received from decoding section 206 is the control information intended for terminal 200. This determination is made in units of decoding results corresponding to the units of extraction processing. For example, determination section 207 demasks the CRC bits by the terminal ID of terminal 200 and determines that the control information resulted in CRC=OK (no error) as the control information intended for terminal 200. Determination section 207 outputs information on the downlink data assignment resource intended for terminal 200, which is included in the control information intended for terminal 200, to extraction section 204.

In addition, when detecting the control information (i.e., downlink assignment control information) intended for terminal 200, determination section 207 informs control section 208 that ACK/NACK signals will be generated (or are present). Moreover, when detecting the control information intended for terminal 200 from PDCCH signals, determination section 207 outputs information on a CCE that has been occupied by the PDCCH to control section 208.

Control section 208 identifies the A/N resource associated with the CCE on the basis of the information on the CCE received from determination section 207. Control section 208 outputs, to primary-spreading section 214-1, a base sequence and a cyclic shift value corresponding to the A/N resource associated with the CCE or the A/N resource previously indicated by base station 100, and also outputs a Walsh sequence and a DFT sequence corresponding to the A/N resource to secondary-spreading section 215-1. In addition, control section 208 outputs the frequency resource information on the A/N resource to IFFT section 218-1. A specific method of identifying A/N resources will be described later.

When determining to transmit bundled ACK/NACK signals using a bundled ACK/NACK resource, control section 208 outputs the base sequence and cyclic shift value corresponding to the reference signal part (i.e., reference signal resource) of the bundled ACK/NACK resource previously indicated by base station 100 to primary-despreading section 214-2 and outputs a Walsh sequence to secondary-despreading section 215-2. In addition, control section 208 outputs the frequency resource information on the bundled ACK/NACK resource to IFFT section 218-2.

Control section 208 outputs a DFT sequence used for spreading the data part of the bundled ACK/NACK resource to spreading section 217 and outputs the frequency resource information on the bundled ACK/NACK resource to IFFT section 218-3.

Control section 208 selects the bundled ACK/NACK resource or the A/N resource and instructs selection section 221 to output the selected resource to radio transmitting section 222. Moreover, control section 208 instructs response signal generating section 212 to generate the bundled ACK/NACK signals or the ACK/NACK signals in accordance with the selected resource.

Demodulation section 209 demodulates the downlink data received from extraction section 204 and outputs the demodulated downlink data to decoding section 210.

Decoding section 210 decodes the downlink data received from demodulation section 209 and outputs the decoded downlink data to CRC section 211.

CRC section 211 performs error detection on the decoded downlink data received from decoding section 210, for each downlink component carrier using CRC and outputs an ACK when CRC=OK (no error) or outputs a NACK when CRC=Not OK (error) to response signal generating section 212. Moreover, CRC section 211 outputs the decoded downlink data as the received data when CRC=OK (no error).

In 3GPP, operation is performed such that the probability of CRC=OK in downlink data is 90% and the probability of CRC=NG is 10%. However, since DTX is not the case and CRC=OK, the probability of ACK is 0.99×0.90=0.891, namely, approximately 89%. Similarly, since DTX is not the case and CRC=NG, the probability of NACK is 0.99× 0.10=0.099, namely, approximately 10%.

Response signal generating section 212 generates response signals on the basis of the reception condition of downlink data (i.e., result of error detection on downlink data) on each downlink component carrier inputted from CRC section 211 and information indicating a predetermined group number. More specifically, when instructed to generate the bundled ACK/NACK signals from control section 208, response signal generating section 212 generates the bundled ACK/NACK signals including the results of error detection for the respective component carriers as individual pieces of data. Meanwhile, when instructed to generate ACK/NACK signals from control section 208, response signal generating section 212 generates ACK/NACK signals of one symbol. Response signal generating section 212 outputs the generated response signals to coding and modulation section 213.

Upon reception of the bundled ACK/NACK signals, coding and modulation section 213 encodes and modulates the received bundled ACK/NACK signals to generate the modulation signals of 12 symbols and outputs the modulation signals to DFT section 216. In addition, upon reception of the ACK/NACK signals of one symbol, coding and modulation section 213 modulates the ACK/NACK signals and outputs the modulation signals to primary-spreading section 214-1.

Primary-spreading sections 214-1 and 214-2 corresponding to the A/N resources and reference signal resources of the bundled ACK/NACK resources spread the ACK/NACK signals or reference signals using the base sequence corresponding to the resources in accordance with the instruction from control section 208 and output the spread signals to secondary-spreading sections 215-1 and 215-2.

Secondary-spreading sections 215-1 and 215-2 spread the received primary-spread signals using a Walsh sequence or a DFT sequence in accordance with an instruction from control section 208 and outputs the spread signals to IFFT sections 218-1 and 218-2.

DFT section 216 performs DFT processing on 12 time-series sets of received bundled ACK/NACK signals to obtain 12 signal components in the frequency-domain. DFT section 216 outputs the 12 signal components to spreading section 217.

Spreading section 217 spreads the 12 signal components received from DFT section 216 using a DFT sequence indicated by control section 208 and outputs the spread signal components to IFFT section 218-3.

IFFT sections 218-1, 218-2 and 218-3 perform IFFT processing on the received signals in association with the frequency positions where the signals are to be allocated, in accordance with an instruction from control section 208. Accordingly, the signals inputted to IFFT sections 218-1, 218-2 and 218-3 (i.e., ACK/NACK signals, the reference signals of A/N resource, the reference signals of bundled ACK/NACK resource and bundled ACK/NACK signals) are transformed into time-domain signals.

CP adding sections 219-1, 219-2 and 219-3 add the same signals as the last part of the signals obtained by IFFT processing to the beginning of the signals as a CP.

Time-multiplexing section 220 time-multiplexes the bundled ACK/NACK signals received from CP adding section 219-3 (i.e., signals transmitted using the data part of the bundled ACK/NACK resource) and the reference signals of the bundled ACK/NACK resource to be received from CP adding section 219-2 on the bundled ACK/NACK resource and outputs the multiplexed signals to selection section 221.

Selection section 221 selects one of the bundled ACK/NACK resource received from time-multiplexing section 220 and the A/N resource received from CP adding section 219-1 and outputs the signals assigned to the selected resource to radio transmitting section 222.

Radio transmitting section 222 performs transmission processing such as D/A conversion, amplification and up-conversion and/or the like on the signals received from selection section 221 and transmits the resultant signals to base station 100 via an antenna.

[Operations of Base Station 100 and Terminal 200]

Operations of base station 100 and terminal 200 having the above-described configurations will be described.

In the present embodiment, a case will be described where in an FDD system, two downlink component carriers (PCell and SCell) are configured in terminal 200 and Channel Selection is configured as an ACK/NACK reporting method. In addition, a case will be described as an example where a transmission mode supporting up to downlink two-CW transmission is configured in each downlink component carrier (FIG. 6C (4-bit mapping)).

Suppose that the probability of ACK is 89%, the probability of NACK is 10% and the probability of DTX is 1%. In this case, when base station 100 assigns PDSCHs of both PCell and SCell in FIG. 6C, the probability of occurrence of each combination of ACK/NACK/DTX (Possibility [%]) and the probability that each PUCCH resource will be used (SUM [%]) are shown in FIG. 13.

As shown in FIG. 13, it is obvious that the probability that PUCCH resources 0 (h0) may be used among respective PUCCH resources is as lowest as 1.97%. This is attributable to the fact that with PUCCH resource 0, the error detection results (b2, b3) corresponding to SCell PDSCHs are always NACK or DTX which corresponds to the lowest probability of occurrence.

When arranged in PCell, PUCCH resource 0 is a PUCCH resource corresponding to an ACK/NACK combination that supports LTE fallback. That is, a specific ACK/NACK pattern corresponding to PCell PDSCHs is identical to an ACK/NACK pattern of the terminal compliant with the LTE system (when communicating with base station 100 using only PCell), and only a pattern candidate in which all ACK/NACKs other than the specific ACK/NACK pattern are NACK or DTX is associated with PUCCH resource 0. With PUCCH resource 0, a phase point with which the specific pattern candidate is associated is identical to a phase point with which an ACK/NACK pattern of the terminal compliant with the LTE system (when communicating with base station 100 using only PCell) is associated.

More specifically, when allocated for PCell, PUCCH resource 0 is a PUCCH resource of PCell associated in a one-to-one correspondence with the top CCE index ($n_{CCE}$) of the CCEs occupied by the PDCCH indicating the PCell PDSCH (PDCCH received by PCell).

Thus, as shown in FIG. 13, the present embodiment assumes only PUCCH resource 0 (h0) corresponding to an ACK/NACK combination supporting LTE fallback to be a PUCCH resource in PCell and assumes PUCCH resources 1 to 3 (h1 to h3) corresponding to other ACK/NACK combinations to be PUCCH resources in SCell. In other words, the present embodiment assumes only PUCCH resource 0 associated in a one-to-one correspondence with the top CCE index ($n_{CCE}$) of the CCEs occupied by the PDCCH indicating PDSCH in PCell to be a PUCCH resource in PCell.

That is, the present embodiment (FIG. 13) switches a PUCCH transmission cell between PCell and SCell depending on whether the ACK/NACK combination supports LTE fallback or not. That is, terminal 200 (control section 208) identifies PUCCH resources (A/N resources) to be used for transmission of ACK/NACK based on the mapping rule shown in FIG. 13. Similarly, base station 100 (PUCCH extracting section 114 and A/N determining section 118) identifies PUCCH resources to be used for response signals transmitted from terminal 200 and an error detection result of each component carrier indicated by the response signal based on the mapping rule shown in FIG. 13.

Thus, LTE fallback can be supported by arranging PUCCH resources corresponding to ACK/NACK combinations supporting at least LTE fallback in PCell. As with the present embodiment, the FDD system can support fallback to Format1a or Format1b. That is, when terminal 200 detects only PDCCH indicating a PCell PDSCH, terminal 200 reports the error detection result to base station 100 using PUCCH resources associated in a one-to-one correspondence with top CCE index $n_{CCE}$ of the PDCCH, and can thereby report the error detection result corresponding to at least PCell PDSCH even for a period during which recognition of the configuration of the number of CCs differs between base station 100 and terminal 200 without any inconsistency between base station 100 and terminal 200.

Alternatively, in FIG. 13, it is also possible to express that a PUCCH transmission cell is switched between SCell and PCell depending on whether all the error detection results (b2, b3) of SCell are NACK or DTX (N/D). More specifically, PUCCH resource 0 allocated for PCell is associated with an ACK/NACK pattern candidate for which all the error detection results of SCell are NACK or DTX and one of PUCCH resources 1 to 3 allocated for SCell is used when at least one ACK is included as the error detection results of SCell.

By so doing, it is possible to prevent accuracy deterioration in ACK/NACK detection when base station 100 detects ACK/NACK across PCell and SCell.

More specifically, when base station 100 assigns PDSCHs of both PCell and SCell to terminal 200, the possibility that ACK/NACK in PCell may be reported by PUCCH resources 1 to 3 in SCell is as high as 98.01%, whereas the possibility that ACK/NACK in PCell may be reported by PUCCH resource 0 in PCell is extremely low as 1.97%. In contrast, if PUCCH resources 0 and 1 are assumed to be PUCCH resources in PCell and PUCCH resources 2 and 3 are assumed to be PUCCH resources in SCell, the probability that PUCCH resources in PCell may be used is 81.36%, whereas the probability that PUCCH resources in SCell may be used is 18.62%.

That is, in the present embodiment, PUCCH resources having a high possibility of being used are jointly arranged in SCell and the probability that ACK/NACK may be detected in SCell becomes extremely high. That is, the probability of occurrence of an ACK/NACK pattern candidate group associated with PUCCH resource 0 allocated for PCell is lower than the probability of occurrence of an ACK/NACK pattern candidate group associated with PUCCH resources 1 to 3 arranged in SCell.

Therefore, for example, base station 100 detects ACK/NACK using PUCCH resources 1 to 3 in SCell which has a high probability of being used first. When ACK/NACK cannot be detected using PUCCH resources 1 to 3 in SCell (e.g., PUCCH receiving power in SCell is low), base station 100 then detects ACK/NACK using PUCCH resource 0 in PCell having a low probability of being used.

That is, when ACK/NACK cannot be detected in SCell, base station 100 can determine whether all the error detection results corresponding to SCell PDSCHs are NACK or DTX (N/D) without detecting ACK/NACK using PUCCH resource 0 in PCell. When ACK/NACK cannot be detected in SCell, base station 100 detects ACK/NACK using PUCCH resource 0 in PCell, and can thereby determine the error detection results corresponding to PCell PDSCHs.

Thus, base station 100 reduces the possibility of detecting ACK/NACK using a plurality of uplink component carriers (here, PCell and SCell), and can thereby prevent accuracy deterioration in ACK/NACK detection caused by differences in a channel environment between component carriers.

When base station 100 assigns only PCell PDSCHs, ACK/NACKs corresponding to the PCell PDSCHs are always reported using PUCCH resource 0 in PCell. Thus, even when terminal 200 goes out of SCell having a smaller coverage as terminal 200 moves, it is possible to continue communication in PCell having a large coverage. That is, it is possible to secure mobility in PCell.

As described above, the present embodiment assumes only PUCCH resource 0 that supports LTE fallback to be a PUCCH resource in PCell and assumes PUCCH resource 1 to PUCCH resource 3 other than PUCCH resource 0 to be PUCCH resources in SCell. By so doing, it is possible to support LTE fallback without increasing the number of PUCCH resources to be used.

Furthermore, the present embodiment assumes only PUCCH resource 0 corresponding to an ACK/NACK combination for which all the SCell error detection results (b2, b3) are NACK or DTX to be a PUCCH resource in PCell. By so doing, the probability of PUCCH resources in SCell being used, that is, the probability of ACK/NACK being detected in SCell increases. Thus, for example, when the base station detects ACK/NACK using only SCell first, and can thereby determine error detection results corresponding to SCell PDSCHs without performing ACK/NACK detection in PCell and reduce accuracy deterioration in ACK/NACK detection.

Furthermore, according to the present embodiment, when only PCell PDSCHs are assigned, ACK/NACKs in PCell are always reported using PUCCH resource 0 in PCell, and it is thereby possible to secure mobility in PCell.

Embodiment 2

A case will be described in the present embodiment where two downlink component carriers (PCell and SCell) are configured in terminal 200 in a TDD system and Channel Selection is configured as an ACK/NACK reporting method. Moreover, a case will be described as an example where four ACK/NACK bits are configured to be transmitted (Step 3 (4-bit mapping) in FIG. 7).

As with Embodiment 1, the present embodiment assumes the probability of ACK to be 89%, the probability of NACK to be 10% and the probability of DTX to be 1%. In the case in Step 3 in FIG. 7 where base station 100 assigns PDSCHs of both PCell and SCell, the probability of occurrence of each combination of ACK/NACK/DTX (Possibility [%]) and the probability that each PUCCH resource may be used (SUM [%]) are shown in FIG. 14.

With regard to PUCCH resource 0 (h0), together with a probability of PUCCH resource 0 itself being used (8.78%), FIG. 14 also describes a probability of occurrence (0.13%) combining "N, N/D, N/D, N/D" and "A, N/D, N/D, N/D" which are ACK/NACK combinations necessary to support fallback to PUCCH Format1a (that is, ACK/NACK combinations in which ACK/NACK combinations other than the first CW of PCell become NACK or DTX), and a probability of occurrence (8.65%) of other ACK/NACK combinations. With regard to PUCCH resource 1 (h1), together with a probability of PUCCH resource 1 itself being used (71.79%), FIG. 14 also describes a probability of occurrence (1.06%) combining "N/D, A, N/D, N/D" and "A, A, N/D, N/D" which are ACK/NACK combinations in which ACK/NACK combinations of SCell always become NACK or DTX, and a probability of occurrence (70.73%) of other ACK/NACK combinations.

As shown in FIG. 15, the present embodiment assumes only PUCCH resource 0 corresponding to ACK/NACK combinations supporting LTE fallback to be a PUCCH resource in PCell and assumes PUCCH resources 1 to 4 corresponding to other ACK/NACK combinations to be PUCCH resources in SCell.

That is, as with Embodiment 1 (FDD system), the present embodiment (FIG. 15) switches PUCCH transmission cells between PCell and SCell depending on whether an ACK/NACK combination supports LTE fallback or not.

In other words, only "N, N/D, N/D, N/D" and "A, N/D, N/D, N/D" are mapped to PUCCH resource 0 in PCell associated in a one-to-one correspondence with the top CCE index ($n_{CCE}$) of the CCEs occupied by the PDCCH indicating the PCell PDSCH and other ACK/NACK combinations are mapped to PUCCH resources in SCell.

More specifically, in FIG. 15, "N, N/D, N/D, N/D" and "A, N/D, N/D, N/D" are mapped to PUCCH resource 0 (h0) in PCell and "A, N/D, N/D, A" and "A, A, N/D, A" are mapped to PUCCH resource 4 (h4) in SCell. Here, PUCCH resources 0 and 4 (h0, h4) shown in FIG. 15 correspond to PUCCH resource 0 (h0) shown in FIG. 14 and Step 3 in FIG. 7. That is, PUCCH resource 0 (h0) shown in FIG. 15 corresponds to phase point ±1 of PUCCH resource 0 (h0) shown in Step 3 in FIG. 7 and PUCCH resource 4 (h4) shown in FIG. 15 corresponds to phase point ±j of PUCCH resource 0 (h0) shown in Step 3 in FIG. 7. That is, "N, N/D, N/D, N/D" and "A, N/D, N/D, N/D" which are ACK/NACK combinations supporting LTE fallback are mapped to PUCCH resource 0 in PCell associated in a one-to-one correspondence with the top CCE index ($n_{CCE}$) of the CCEs occupied by PDCCH indicating the PCell PDSCH. On the other hand, "A, N/D, N/D, A" and "A, A, N/D, A" which are ACK/NACK combinations supporting LTE fallback are mapped to PUCCH resource 4 in SCell. PUCCH resources 1 to 3 shown in FIG. 15 are similar to FIG. 14 and Step 3 in FIG. 7.

Thus, as with Embodiment 1, LTE fallback can be supported by arranging in PCell, PUCCH resources corresponding to ACK/NACK combinations supporting at least LTE fallback. The TDD system as with the present embodiment can support fallback to Format1a.

Moreover, as with Embodiment 1, base station 100 detects ACK/NACK across PCell and SCell, and can thereby prevent accuracy deterioration in ACK/NACK detection.

More specifically, when base station 100 assigns PDSCHs of both PCell and SCell to terminal 200, the possibility that ACK/NACK of PCell may be reported by PUCCH resources 1 to 4 in SCell is as high as 99.86%, whereas the possibility that ACK/NACK of PCell may be reported by PUCCH resource 0 in PCell is as extremely low as 0.13%.

That is, as with Embodiment 1, compared to a case where PUCCH resources 0 and 1 are assumed to be PUCCH resources in PCell (probability of use: 81.36%) and PUCCH resources 2 and 3 are assumed to be PUCCH resources in SCell (probability of use: 18.62%), in the present embodiment, PUCCH resources having a high probability of use are arranged jointly in SCell, which makes extremely high the probability that ACK/NACK may be detected in SCell.

Therefore, as with Embodiment 1, base station 100 detects ACK/NACK using PUCCH resources 1 to 4 in SCell having a high probability of use first, and when ACK/NACK cannot be detected in SCell, base station 100 detects ACK/NACK using PUCCH resource 0 in PCell having a low probability of use.

Thus, when ACK/NACK detection is not possible in SCell, base station 100 can determine that all error detection results corresponding to SCell PDSCHs are NACK or DTX (N/D) without detecting ACK/NACK using PUCCH resource 0 in PCell. When ACK/NACK detection is not possible in SCell, base station 100 detects ACK/NACK using PUCCH resource 0 in PCell, and can thereby determine error detection results corresponding to PCell PDSCHs.

Thus, base station 100 reduces the possibility that ACK/NACK may be detected using a plurality of uplink component carriers, and can thereby prevent accuracy deterioration in ACK/NACK detection due to differences in a channel environment between component carriers as with Embodiment 1.

As described above, in the TDD system, the present embodiment assumes only PUCCH resource 0 supporting LTE fallback to be a PUCCH resource in PCell and assumes PUCCH resource 1 to PUCCH resource 4 other than PUCCH resource 0 to be PUCCH resources in SCell as with Embodiment 1 (FDD system). By so doing, it is possible to support LTE fallback and reduce deterioration in ACK/NACK detection accuracy.

Embodiment 3

As with Embodiment 2, a case will be described in the present embodiment where in a TDD system, two downlink component carriers (PCell and SCell) are configured in terminal 200 and Channel Selection is configured as an ACK/NACK reporting method. Also a case will be described as an example where four ACK/NACK bits are configured to be transmitted (case of Step 3 (4-bit mapping) in FIG. 7).

In Embodiment 2, when base station 100 assigns only PCell PDSCHs, ACK/NACKs in PCell are not always reported using PUCCH resource 0 in PCell. That is, ACK/NACKs in PCell can also be reported using PUCCH resource 4 in SCell. For this reason, when terminal 200 goes out of SCell having a small coverage as terminal 200 moves, there may be a case where communication in PCell having a large coverage is not possible. That is, mobility in PCell cannot be secured in Embodiment 2. Thus, a method for securing mobility in PCell will be described in the present embodiment.

In order to secure mobility in PCell, it is necessary to report ACK/NACK combinations for which all error detection results in SCell are NACK or DTX using only resources in PCell. That is, it is necessary to report, using resources in PCell, "N/D, A, N/D, N/D" and "A, A, N/D, N/D" in addition to ACK/NACK combinations ("N, N/D, N/D, N/D" and "A, N/D, N/D, N/D") supporting LTE fallback (fallback to Format1a in a TDD system).

Thus, as shown in FIG. 16, the present embodiment assumes PUCCH resources 0 and 1 (h0,h1) corresponding to ACK/NACK combinations for which all error detection results of SCell are NACK or DTX to be PUCCH resources in PCell and assumes PUCCH resources 2 to 5 corresponding to other ACK/NACK combinations to be PUCCH resources in SCell.

That is, in FIG. 16, PUCCH transmission cells are switched between SCell and PCell depending on whether all error detection results of SCell are NACK or DTX.

In other words, in addition "N, N/D, N/D, N/D" and "A, N/D, N/D, N/D" mapped to PUCCH resources in PCell associated in a one-to-one correspondence with the top CCE index ($n_{CCE}$) of the CCEs occupied by PDCCH indicating the PCell PDSCH, also "N/D, A, N/D, N/D" and "A, A, N/D, N/D" are mapped to PUCCH resources in PCell and other ACK/NACK combinations are mapped to PUCCH resources in SCell.

More specifically, in FIG. 16, "N, N/D, N/D, N/D" and "A, N/D, N/D, N/D" are mapped to PUCCH resource 0 (h0) in PCell as with Embodiment 1 and "A, N/D, N/D, A" and "A, A, N/D, A" are mapped to PUCCH resources 4 (h4) in SCell. That is, in FIG. 16, ACK/NACK combinations ("N, N/D, N/D, N/D" and "A, N/D, N/D, N/D") supporting LTE fallback are mapped to resources in PCell as with Embodiment 1.

It is thereby possible to support LTE fallback as with Embodiments 1 and 2.

In FIG. 16, "N/D, A, N/D, N/D" and "A, A, N/D, N/D" are mapped to PUCCH resources 1 (h1) in PCell, and "N/D, A, A, A" and "A, A, A, A" are mapped to PUCCH resources 5 (h5) in SCell. Here, PUCCH resources 1 and 5 (h1, h5) shown in FIG. 16 correspond to PUCCH resource 1 (h1) shown in FIG. 14 and Step 3 in FIG. 7. That is, PUCCH resource 1 (h1) shown in FIG. 16 corresponds to phase point +j of PUCCH resources 1 (h1) shown in Step 3 in FIG. 7 and PUCCH resource 5 (h5) shown in FIG. 16 corresponds to phase point +1 of PUCCH resource 1 (h1) shown in Step 3 in FIG. 7. Furthermore, PUCCH resources 2 and 3 shown in FIG. 15 are similar to those in FIG. 14 and in Step 3 in FIG. 7.

Thus, "N, N/D, N/D, N/D" and "A, N/D, N/D, N/D" which are ACK/NACK combinations supporting LTE fallback and for which all error detection results of SCell are NACK or DTX, and "N/D, A, N/D, N/D" and "A, A, N/D, N/D" which are ACK/NACK combinations for which all other error detection results of SCell are NACK or DTX are mapped to PUCCH resources 0 and 1 in PCell, and other ACK/NACK combinations are mapped to PUCCH resources 2 to 5 in SCell.

Thus, as with Embodiment 1, base station 100 detects ACK/NACK across PCell and SCell, and can thereby prevent accuracy deterioration in ACK/NACK detection.

More specifically, when base station 100 assigns PDSCHs of both PCell and SCell to terminal 200, the possibility that ACK/NACK of PCell may be reported using PUCCH resources 2 to 5 in SCell is as high as 98.80%, whereas the possibility that ACK/NACK of PCell may be reported using PUCCH resource 0 or 1 in PCell is as extremely low as 1.19%.

That is, as with Embodiment 2, compared to a case where PUCCH resources 0 and 1 are assumed to be PUCCH resources in PCell (probability of use: 81.36%) and PUCCH resources 2 and 3 are assumed to be PUCCH resources in SCell (probability of use: 18.62%), in the present embodiment, PUCCH resources having a high probability of use are arranged jointly in SCell and the probability that ACK/NACK may be detected in SCell becomes extremely high.

Therefore, as with Embodiment 2, for example, base station 100 detects ACK/NACK using PUCCH resources 2 to 5 in SCell having a high probability of use first, and when ACK/NACK detection in SCell is not possible, base station 100 then detects ACK/NACK using PUCCH resources 0 and 1 in PCell having a low probability of use.

Thus, when ACK/NACK detection in SCell is not possible, base station 100 can determine that all error detection results corresponding to SCell PDSCHs are NACK or DTX(N/D) without performing ACK/NACK detection using PUCCH resources 0 and 1 in PCell. Furthermore, when ACK/NACK detection in SCell is not possible, base station 100 then detects ACK/NACK using PUCCH resources 0 and 1 in PCell, and can thereby determine error detection results corresponding to PCell PDSCHs.

Thus, base station 100 reduces the possibility that ACK/NACK detection may be perfumed using a plurality of uplink component carriers, and can thereby prevent accuracy deterioration in ACK/NACK detection due to differences in a channel environment between component carriers as with Embodiment 2.

When base station 100 assigns only PCell PDSCHs as with Embodiment 1, ACK/NACKs in PCell are always reported using PUCCH resource 0 in PCell. Thus, even when terminal 200 becomes outside of SCell having a small coverage as terminal 200 moves, it is possible to continue communication in PCell having a large coverage. That is, mobility in PCell can be secured.

As described above, the present embodiment assumes PUCCH resources 0 and 1 (resources for which ACK/NACK of SCell is NACK or DTX) that report only ACK/NACK of PCell to be PUCCH resources in PCell and assumes other PUCCH resources 2 to 5 to be PUCCH resources in SCell. Here, PUCCH resources that report only ACK/NACK of PCell include PUCCH resource 0 supporting LTE fallback. Thus, according to the present embodiment, it is possible to support LTE fallback and also reduce accuracy deterioration in ACK/NACK detection. Furthermore, according to the present embodiment, it is possible to secure mobility in PCell as with Embodiment 1.

Embodiment 4

As with Embodiment 2, a case will be described in the present embodiment where in a TDD system, two downlink component carriers (PCell and SCell) are configured in terminal 200 and Channel Selection is configured as an ACK/NACK reporting method. Moreover, a case will be described as an example where four ACK/NACK bits are configured to be transmitted (case of Step 3 in FIG. 7 (4-bit mapping)).

In Embodiment 2, a total of five PUCCH resources is used to support LTE fallback and prevent accuracy deterioration in ACK/NACK detection (see FIG. 15). In contrast, the present embodiment will describe a method for supporting LTE fallback and preventing accuracy deterioration in ACK/NACK detection by using a total of four PUCCH resources.

As shown in FIG. 17, the present embodiment assumes PUCCH resource 0 (h0) including ACK/NACK combinations supporting LTE fallback to be a PUCCH resource in PCell and assumes other PUCCH resources 1 to 3 (h1 to h3) to be PUCCH resources in SCell.

In other words, only PUCCH resource 0 associated in a one-to-one correspondence with the top CCE index ($n_{CCE}$) of the CCEs occupied by PDCCH indicating the PDSCH in PCell is assumed to be a PUCCH resource in PCell and PUCCH resources 1 to 3 other than PUCCH resource 0 are assumed to be PUCCH resources in SCell. As shown in FIG.

17, PUCCH resource 0 includes ACK/NACK combinations ("N, N/D, N/D, N/D" and "A, N/D, N/D, N/D") supporting LTE fallback.

By so doing, it is possible to support LTE fallback without increasing the number of PUCCH resources to be used compared to Embodiment 2 (see FIG. 15).

Furthermore, as with Embodiment 2, base station 100 detects ACK/NACK across PCell and SCell, and can thereby prevent accuracy deterioration in ACK/NACK detection.

More specifically, when base station 100 assigns PDSCHs of both PCell and SCell to terminal 200, the possibility that ACK/NACKs of PCell and SCell may be reported using PUCCH resources 1 to 3 in SCell is as high as 91.21% while the possibility that ACK/NACKs of PCell and SCell may be reported using PUCCH resource 0 in PCell is as relatively low as 8.78%.

That is, as with Embodiment 2, compared to a case where PUCCH resources 0 and 1 are assumed to be PUCCH resources in PCell (probability of use: 81.36%) and PUCCH resources 2 and 3 are assumed to be PUCCH resources in SCell (probability of use: 18.62%), in the present embodiment, PUCCH resources having a high probability of use are arranged jointly in SCell and the probability that ACK/NACKs in SCell may be detected becomes extremely high.

Therefore, for example, base station 100 detects ACK/NACK using PUCCH resources 1 to 3 in SCell having a high probability of use first, and when ACK/NACK detection is not possible using PUCCH resources 1 to 3 in SCell, base station 100 then detects ACK/NACK using PUCCH resource 0 in PCell having a low probability of use.

Thus, as with Embodiment 2, when ACK/NACK detection in SCell is not possible, base station 100 can determine that all error detection results corresponding to SCell PDSCHs are NACK or DTX(N/D) without performing ACK/NACK detection using PUCCH resource 0 in PCell. Moreover, when ACK/NACK detection in SCell is not possible, base station 100 then detects ACK/NACK using PUCCH resource 0 in PCell and can thereby determine error detection results corresponding to PDSCHs in PCell.

As described above, the present embodiment assumes PUCCH resource 0 including ACK/NACK combinations supporting at least LTE fallback to be a PUCCH resource in PCell and assumes PUCCH resources 1 to 3 other than PUCCH resource 0 to be PUCCH resources in SCell. By so doing, it is possible to support LTE fallback without increasing the number of PUCCH resources to be used and also reduce accuracy deterioration in ACK/NACK detection.

Each embodiment according to the present invention has been described so far.

As the method for reporting PUCCH resources in SCell in the above embodiments, when PDCCH indicating the SCell PDSCHs are in SCell, PUCCH resources associated with the top CCE index ($n_{CCE}'$) of the CCEs occupied by the PDCCH and the next ($n_{CCE}'+1$) may be used or PUCCH resources configured beforehand by the base station may be used. Alternatively, a method may be adopted in which a plurality of PUCCH resources are configured beforehand and one of them is selected using ARI reported using PDCCH indicating the SCell PDSCH. Regarding PUCCH resources 1 (see FIG. 16) in PCell not supporting LTE fallback in Embodiment 3, PUCCH resources associated with ($n_{CCE}+1$) adjacent to the top CCE index of the CCEs occupied by PDCCH indicating the PCell PDSCH may be used or PUCCH resources configured beforehand by the base station may be used. Furthermore, a method may be adopted in which a plurality of PUCCH resources are configured beforehand, ARI is reported using PDCCH indicating the PCell PDSCH and one of them is selected using the ARI. In short, the present invention is intended to disclose to which of PCell or SCell PUCCH resources other than PUCCH resource 0 supporting LTE fallback belong, and not intended to limit a reporting method thereof.

In the foregoing embodiments, the present invention is configured with hardware by way of example, but the invention may also be provided by software in concert with hardware.

In addition, the functional blocks used in the descriptions of the embodiments are typically implemented as LSI devices, which are integrated circuits. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor other than an LSI. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A terminal apparatus according to the embodiment described above is a terminal apparatus that communicates with a base station apparatus using a plurality of component carriers, the terminal apparatus including: a generating section that generates a response signal using an error detection result of each piece of downlink data transmitted using the plurality of component carriers; and a control section that transmits the response signal using an uplink control channel based on a mapping rule, in which: the mapping rule associates a pattern candidate of the error detection result with a plurality of resources of the uplink control channel used for transmission of the response signal and phase points in each resource; a first resource among the plurality of resources is associated with at least a first pattern candidate in which a pattern of a specific error detection result corresponding to downlink data of a first component carrier is identical to a pattern of an error detection result when communication with the base station apparatus is performed using only the first component carrier, and all error detection results other than the specific error detection result are NACK or DTX; a phase point associated with the first pattern candidate is identical to a phase point associated with an error detection result pattern when communication with the base station apparatus is performed using only the first component carrier; and at least the first resource among the plurality of resources is allocated for the first component carrier.

In the terminal apparatus according to the embodiment: only the first pattern candidate is associated with the first resource; and a resource other than the first resource and associated with a pattern candidate other than the first pattern candidate is assigned in a second component carrier other than the first component carrier.

In the terminal apparatus according to the embodiment: a second resource which is a resource different from the first resource and associated with a second pattern candidate for which all error detection results corresponding to downlink data of a second component carrier other than the first component carrier are NACK or DTX is allocated for the first component carrier; and a resource other than the first resource and the second resource is allocated for the second component carrier.

In the terminal apparatus according to the embodiment: a resource other than the first resource is allocated for a second component carrier other than the first component carrier.

In the terminal apparatus according to the embodiment: a probability of occurrence of a pattern candidate group associated with resources allocated for the first component carrier is lower than a probability of occurrence of a pattern candidate group associated with resources allocated for a second component carrier other than the first component carrier.

In the terminal apparatus according to the embodiment, the first resource is a resource associated with a top index of a control channel element (CCE) occupied by downlink control information received by the first component carrier.

In the terminal apparatus according to the embodiment: in an FDD (Frequency Division Duplex) system, mapping to the first pattern candidate supports fallback to Format1a or Format1b.

In the terminal apparatus according to the embodiment, in a TDD (Time Division Duplex) system, mapping to the first pattern candidate supports fallback to Format1a.

In the terminal apparatus according to the embodiment, the first component carrier is a band used by a base station having a wide coverage and a second component carrier other than the first component carrier is a band used by a base station having a narrow coverage.

A transmission method according to the embodiment is a transmission method for a terminal apparatus that communicates with a base station apparatus using a plurality of component carriers, the method including: generating a response signal using an error detection result of each piece of downlink data transmitted using the plurality of component carriers; and transmitting the response signal using an uplink control channel based on a mapping rule; in which: the mapping rule associates a pattern candidate of the error detection result with a plurality of resources of the uplink control channel used for transmission of the response signal and phase points in each resource; a first resource among the plurality of resources is associated with at least a first pattern candidate in which a pattern of a specific error detection result corresponding to downlink data of a first component carrier is identical to an error detection result pattern when communication with the base station apparatus is performed using only the first component carrier, and all error detection results other than the specific error detection result are NACK or DTX; a phase point associated with the first pattern candidate is identical to a phase point associated with an error detection result pattern when communication with the base station apparatus is performed using only the first component carrier; and at least the first resource among the plurality of resources is allocated for the first component carrier.

The disclosure of the specification, drawings, and abstract in Japanese Patent Application No. 2012-117626 filed on May 23, 2012 is incorporated herein by reference in its entirety.

INDUSTRIAL APPLICABILITY

The present invention is suitable for use in mobile communication systems or the like.

REFERENCE SIGNS LIST

100 Base station
200 Terminal
101, 208 Control section
102 Control information generating section
103, 105 Coding section
104, 107 Modulation section
106 Data transmission controlling section
108 Mapping section
109, 218 IFFT section
110, 219 CP adding section
111, 222 Radio transmitting section
112, 201 Radio receiving section
113, 202 CP removing section
114 PUCCH extracting section
115 Despreading section
116 Sequence controlling section
117 Correlation processing section
118 A/N determining section
119 Bundled A/N despreading section
120 IDFT section
121 Bundled A/N determining section
122 Retransmission control signal generating section
203 FFT section
204 Extraction section
205, 209 Demodulation section
206, 210 Decoding section
207 Determination section
211 CRC section
212 Response signal generating section
213 Coding and modulation section
214 Primary-spreading section
215 Secondary-spreading section
216 DFT section
217 Spreading section
220 Time multiplexing section
221 Selection section

The invention claimed is:

1. A terminal apparatus that communicates with a base station apparatus using a plurality of component carriers, the terminal apparatus comprising:

a generating section that generates a response signal indicative of error detection results of downlink data respectively transmitted using the plurality of component carriers; and a control section that transmits the response signal using an uplink control channel based on a mapping rule, wherein:

the mapping rule associates a pattern candidate of the error detection results with one of a plurality of resources of the uplink control channel and a phase point in the corresponding resource, the pattern candidate comprising a first error detection result corresponding to downlink data of a first component carrier and a second error detection result corresponding to downlink data of a second component carrier different from the first component carrier;

a first resource among the plurality of resources is associated with at least a first pattern candidate in which the first error detection result is identical to an error detection result when communication with the base station apparatus is performed using only the first component carrier, and in which the second error detection results are NACK or DTX;

a phase point associated with the first pattern candidate is identical to a phase point associated with the error detection result when communication with the base station apparatus is performed using only the first component carrier;

at least the first resource among the plurality of resources is allocated for the first component carrier; and a resource other than the first resource and associated with a pattern candidate, in which at least the second error detection result is ACK, is allocated for the second component carrier.

2. The terminal apparatus according to claim 1, wherein: only the first pattern candidate is associated with the first resource; and the resource other than the first resource is associated with a pattern candidate other than the first pattern candidate.

3. The terminal apparatus according to claim 1, wherein:

a second resource which is a resource different from the first resource and associated with a second pattern candidate in which the second error detection results are NACK or DTX is allocated for the first component carrier; and a resource other than the first resource and the second resource is allocated for the second component carrier.

4. The terminal apparatus according to claim 1, wherein a resource other than the first resource is allocated for the second component carrier.

5. The terminal apparatus according to claim 1, wherein a probability of occurrence of a pattern candidate group associated with resources allocated for the first component carrier is lower than a probability of occurrence of a pattern candidate group associated with resources allocated for the second component carrier.

6. The terminal apparatus according to claim 1, wherein the first resource is a resource associated with a top index of a control channel element (CCE) occupied by downlink control information received by the first component carrier.

7. The terminal apparatus according to claim 1, wherein in an FDD (Frequency Division Duplex) system, mapping to the first pattern candidate supports fallback to Format1a or Format1b.

8. The terminal apparatus according to claim 1, wherein in a TDD (Time Division Duplex) system, mapping to the first pattern candidate supports fallback to Format1a.

9. The terminal apparatus according to claim 1, wherein the first component carrier is a band used by a base station having a wide coverage and the second component carrier is a band used by a base station having a narrow coverage.

10. A transmission method for a terminal apparatus that communicates with a base station apparatus using a plurality of component carriers, the method comprising:

generating a response signal indicative of error detection results of downlink data respectively transmitted using the plurality of component carriers; and transmitting the response signal using an uplink control channel based on a mapping rule; wherein:

the mapping rule associates a pattern candidate of the error detection results with one of a plurality of resources of the uplink control channel and a phase point in the corresponding resource, the pattern candidate comprising a first error detection result corresponding to downlink data of a first component carrier and a second error detection result corresponding to downlink data of a second component carrier different from the first component carrier;

a first resource among the plurality of resources is associated with at least a specific pattern candidate in which the first error detection result is identical to an error detection result when communication with the base station apparatus is performed using only the first component carrier, and in which the second error detection results are NACK or DTX;

a phase point associated with the specific pattern candidate is identical to a phase point associated with the error detection result when communication with the base station apparatus is performed using only the first component carrier;

at least the first resource among the plurality of resources is allocated for the first component carrier; and a resource other than the first resource and associated with a pattern candidate, in which at least the second error detection result includes ACK is allocated for second component carrier.

* * * * *